United States Patent
Ono et al.

(10) Patent No.: US 9,624,433 B2
(45) Date of Patent: Apr. 18, 2017

(54) LIQUID CRYSTAL DISPLAY DEVICE

(71) Applicant: DIC CORPORATION, Tokyo (JP)

(72) Inventors: Yoshiyuki Ono, Kita-adachi-gun (JP); Jouji Kawamura, Kita-adachi-gun (JP); Yoshinori Iwashita, Kita-adachi-gun (JP); Hiroyuki Takeda, Sakura (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 14/442,198

(22) PCT Filed: Nov. 13, 2013

(86) PCT No.: PCT/JP2013/080673
§ 371 (c)(1),
(2) Date: May 12, 2015

(87) PCT Pub. No.: WO2015/071976
PCT Pub. Date: May 21, 2015

(65) Prior Publication Data
US 2016/0244667 A1    Aug. 25, 2016

(51) Int. Cl.
*G02F 1/1333* (2006.01)
*C09K 19/30* (2006.01)
*C09K 19/20* (2006.01)
*C09K 19/42* (2006.01)
*C09K 19/44* (2006.01)
*G02F 1/1339* (2006.01)
*C09K 19/54* (2006.01)
*C09K 19/04* (2006.01)
*C09K 19/12* (2006.01)
*C09K 19/34* (2006.01)

(52) U.S. Cl.
CPC .......... *C09K 19/3066* (2013.01); *C09K 19/20* (2013.01); *C09K 19/42* (2013.01); *C09K 19/44* (2013.01); *C09K 19/542* (2013.01); *G02F 1/1339* (2013.01); *C09K 2019/0448* (2013.01); *C09K 2019/0466* (2013.01); *C09K 2019/122* (2013.01); *C09K 2019/123* (2013.01); *C09K 2019/124* (2013.01); *C09K 2019/301* (2013.01); *C09K 2019/3004* (2013.01); *C09K 2019/3009* (2013.01); *C09K 2019/3016* (2013.01); *C09K 2019/3019* (2013.01); *C09K 2019/3025* (2013.01); *C09K 2019/3422* (2013.01); *C09K 2019/548* (2013.01)

(58) Field of Classification Search
CPC .... C09K 19/3066; C09K 19/20; C09K 19/42; C09K 19/44; C09K 19/542; C09K 2019/0466; C09K 2019/122–2019/124; C09K 2019/3004; C09K 2019/3009; C09K 2019/3016; C09K 2019/3019; C09K 2019/3025; C09K 2019/3422; C09K 2019/548; C09K 2019/0448; C09K 2019/301; G02F 1/1333; G02F 1/1339
USPC ........................................... 428/1.1; 349/182
See application file for complete search history.

(56) References Cited

U.S. PATENT DOCUMENTS

| | | | |
|---|---|---|---|
| 9,200,202 B2 * | 12/2015 | Kawamura | ........... C09K 19/062 |
| 2015/0028257 A1 | 1/2015 | Kawamura | |
| 2016/0244667 A1 * | 8/2016 | Ono | ........... C09K 19/20 |

FOREIGN PATENT DOCUMENTS

| | | |
|---|---|---|
| JP | 2005-18022 A | 1/2005 |
| JP | 2006-23582 A | 1/2006 |
| JP | 2008-116825 A | 5/2008 |
| JP | 5282989 B1 | 9/2013 |
| JP | 5311168 B1 | 10/2013 |
| KR | 1020090067159 A | 6/2009 |
| TW | 201303440 A | 1/2013 |

OTHER PUBLICATIONS

International Search Report dated Feb. 10, 2014 issued in corresponding application No. PCT/JP2013/080673.

* cited by examiner

*Primary Examiner* — Geraldina Visconti
(74) *Attorney, Agent, or Firm* — Westerman, Hattori, Daniels & Adrian, LLP

(57) ABSTRACT

The present invention relates to a liquid crystal display device including a specific liquid crystal composition and a sealant containing the cured product of a specific curable resin composition.
The present invention provides a liquid crystal display device which prevents a decrease in the voltage holding ratio (VHR) of the liquid crystal layer and an increase in ion density (ID) and which enables elimination of problematic defective display such as voids, uneven alignment, and screen burn-in.
Since the liquid crystal display device of the present invention prevents a decrease in the voltage holding ratio (VHR) of the liquid crystal layer and enables a reduction in defective display such as uneven alignment and screen burn-in, it is particularly useful for active-matrix liquid crystal display devices of an IPS mode and FFS mode and can be applied to liquid crystal display apparatuses such as liquid crystal TVs, monitors, mobile phones, and smartphones.

13 Claims, 1 Drawing Sheet

LIQUID CRYSTAL DISPLAY DEVICE

TECHNICAL FIELD

The present invention relates to a liquid crystal display device.

BACKGROUND ART

Liquid crystal display devices have been applied to, for example, watches, calculators, a variety of household electrical appliances, measuring equipment, panels used in automobiles, word processors, electronic notebooks, printers, computers, and television sets. Representative examples of types of liquid crystal display devices include a TN (twisted nematic) type, an STN (super twisted nematic) type, a DS (dynamic scattering) type, a GH (guest-host) type, an IPS (in-plane switching) type, an OCB (optically compensated birefringence) type, an ECB (electrically controlled birefringence) type, a VA (vertical alignment) type, a CSH (color super homeotropic) type, and an FLC (ferroelectric liquid crystal) type. Regarding a drive system, multiplex driving has become popular instead of typical static driving; a passive matrix, in particular, an active matrix (AM) in which, for example, a TFT (thin film transistor) or a TFD (thin film diode) is used for driving has become mainstream in recent years.

In a method for manufacturing liquid crystal display devices, a dropping technique involving use of an optically and thermally curable sealant is widely used. In the dropping technique, a rectangular sealing pattern is formed on one of two transparent substrates each having an electrode by using a dispenser or by screen printing. Then, fine droplets of liquid crystal are dropped onto the entire surface of the transparent substrate inside the frame in a state in which the sealant has not been cured yet, this transparent substrate is immediately attached to the other transparent substrate, and then the sealing part is irradiated with ultraviolet to be temporarily cured. Then, the sealant is completely cured by heating in a process of liquid crystal annealing to produce a liquid crystal display device. Attaching the substrates to each other under reduced pressure enables production of liquid crystal display devices with significantly high efficiency.

Since the dropping technique has a process in which an uncured sealant directly contacts liquid crystal material, the liquid crystal material is contaminated by a component of the sealant, which has been greatly problematic. In addition, residues, such as an unreacted polymerization initiator and a curing agent, and ionic impurities contained in a cured sealant have been also problematic. These days, in liquid crystal panels, liquid crystal driven at low voltage (low-voltage liquid crystal) tends to be used for the purpose of a reduction in power consumption, for instance, in application to mobile devices. Such low-voltage liquid crystal has a particularly large dielectric anisotropy and therefore easily takes in impurities, which readily results in defective alignment and a reduction in a voltage holding ratio over time. In particular, residues, such as an unreacted polymerization initiator and an initiator after curing, ionic impurities such as chlorine, or silane coupling agents contained in a sealant flow into a liquid crystal material, and thus problems such as defective alignment and a reduction in a voltage holding ratio over time are caused.

In such circumstances, in order to prevent a component of a sealant from flowing into a liquid crystal material, there has been a suggestion in which the softening point of an epoxy resin contained in the sealant is enhanced for prevention of contamination of the liquid crystal material due to contact thereof with an uncured sealant and for a reduction in color unevenness (Patent Literature 1). Another suggestion for preventing a component of a sealant from flowing has been made; the sealant having a composition which enables both optical curing and thermal curing is prepared, the sealant is applied and then temporarily cured by being irradiated with light in order to avoid contamination brought about by contact thereof with a liquid crystal material, two substrates are attached to each other, and then the sealant is completely cured by heating (Patent Literature 2). In order to enable this suggestion, an acrylic-acid-modified epoxy resin produced by the reaction of an epoxy resin with acrylic acid is used as a component of the sealant.

In general, epoxy resins have a high adhesiveness but greatly tend to contaminate liquid crystal materials. It is expected that the above-mentioned modification with acrylic acid also contributes to a reduction in contamination of liquid crystal materials. The modification with acrylic acid, however, impairs thermosetting properties, which results in contamination of a liquid crystal material due to flowing of a component of the sealant thereinto in some cases. Another suggestion has been therefore made in order to cure an acrylic component; a tertiary amine such as imidazole is added to thermally cure an acrylic resin owing to the interaction thereof with a small amount of an epoxy resin which has been also added (Patent Literature 3).

In each of the suggestions, however, liquid crystal materials generally used are considered, attention is paid to the composition of the sealant, and a change is made to the composition of the sealant with the aim of solving the problems. Hence, in the case where such suggestions are applied to individual liquid crystal display devices, the liquid crystal display devices do not necessarily have sufficient display properties in many cases; in particular, the screen burn-in of a liquid crystal display device has not been sufficiently overcome.

CITATION LIST

Patent Literature

PTL 1: Japanese Unexamined Patent Application Publication No. 2006-23582
PTL 2: Japanese Unexamined Patent Application Publication No. 2005-18022
PTL 3: Japanese Unexamined Patent Application Publication No. 2008-116825

SUMMARY OF INVENTION

Technical Problem

In the present invention, the interaction of the composition of a liquid crystal material with a sealant is considered even though attention has typically not been paid so much thereto, and a combination of the composition of liquid crystal and the composition of a sealant for an improvement in the defective display of liquid crystal display devices, such as screen burn-in, is proposed.

In particular, it is an object of the present invention to provide a liquid crystal display device in which a specific liquid crystal composition and a sealant which is the cured product of a specific curable resin composition are used; use of such a liquid crystal composition and sealant gives a practical temperature range of a liquid phase, dielectric anisotropy (Δ∈) with a large absolute value, low viscosity, and proper refractive index anisotropy (Δn), prevents a decrease in the voltage holding ratio (VHR) of the liquid crystal layer, and eliminates problematic defective display such as voids, uneven alignment, and screen burn-in.

Solution to Problem

The inventors have intensively studied a combination of the structure of a curable resin composition contained in a sealant and the structure of a liquid crystal material used in a liquid crystal layer in order to achieve such an object and found that using a liquid crystal material having a specific structure and a sealant containing the cured product of a specific curable resin composition in a liquid crystal display device prevents a decrease in the voltage holding ratio (VHR) of the liquid crystal layer and eliminates problematic defective display such as voids, uneven alignment, and screen burn-in, thereby accomplishing the present invention.

In particular, the present invention provides a liquid crystal display device including a first substrate, a second substrate, a liquid crystal layer containing a liquid crystal composition and disposed between the first and second substrates, and a sealant which is a cured product of a curable resin composition which is cured by being exposed to an energy ray or heat, the first and second substrates being attached to each other by the sealant, wherein the liquid crystal composition contains at least one compound represented by General Formula (I)

[Chem. 1]

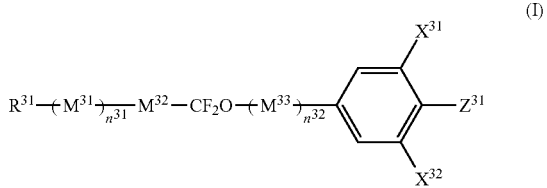

(in the formula, $R^{11}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— moieties of the trans-1,4-cyclohexylene group are optionally substituted with —O— such that oxygen atoms do not directly adjoin each other, and one or two hydrogen atoms of the phenylene group are optionally substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is equal to 0, 1, or 2; in the case where $M^{31}$ is multiple, the multiple $M^{31}$'s are the same as or different from each other; and in the case where $M^{33}$ is multiple, the multiple $M^{33}$'s are the same as or different from each other), and the curable resin composition contains a compound having at least one (meth)acrylic group and at least one epoxy group per molecule.

Advantageous Effects of Invention

In the liquid crystal display device of the present invention, using a specific liquid crystal composition and a sealant containing the cured product of a specific curable resin composition can give a practical temperature range of a liquid crystal layer, dielectric anisotropy (Δ∈) with a large absolute value, low viscosity, and proper refractive index anisotropy (Δn); prevent a decrease in the voltage holding ratio (VHR) of the liquid crystal layer; and eliminate defective display such as voids, uneven alignment, and screen burn-in.

REFERENCE SIGNS LIST

1 Substrate
2 Sealant
3 Liquid crystal
4 Driver
5 Wires from pixel electrodes
6 Overcoat layer
7 Pixel electrode or wire
8 Alignment film

DESCRIPTION OF EMBODIMENTS

Figure 1:
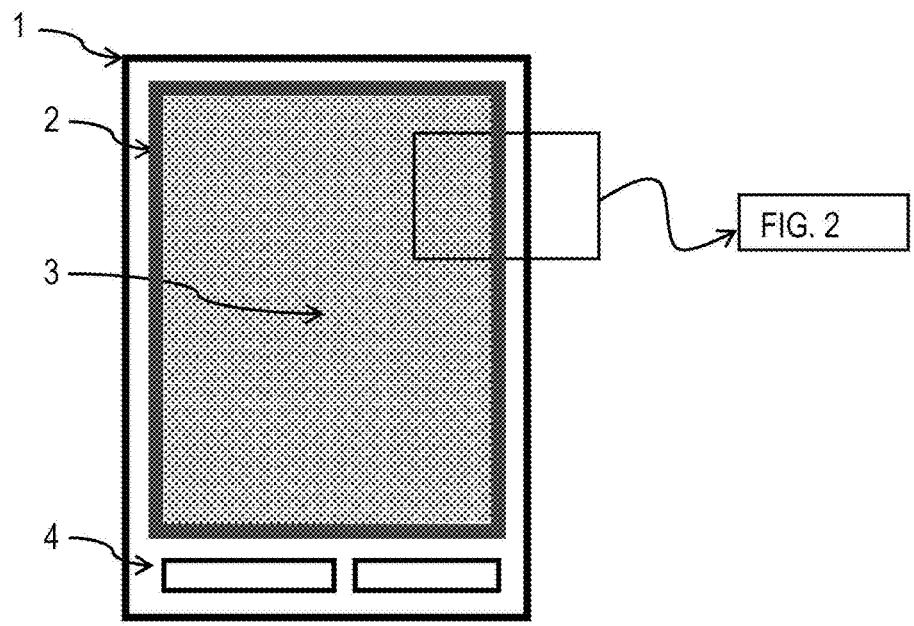
FIG. 1 is a plan view illustrating a liquid crystal display device of the present invention.
Figure 2:
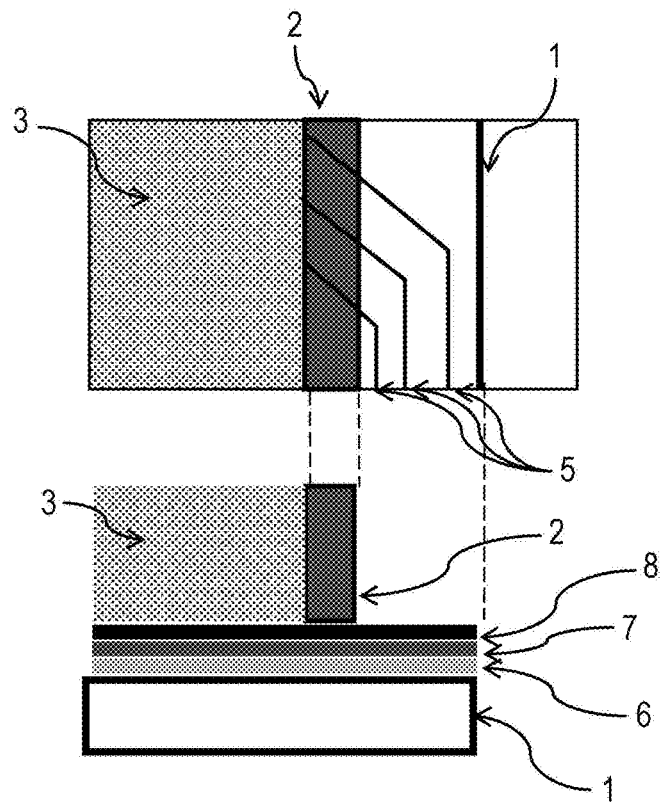
FIG. 2 is an enlarged view illustrating the liquid crystal display device of the present invention.

FIG. 1 is a plan view illustrating the liquid crystal display device of the present invention. The details of pixel electrodes, TFTs, wires, and another component are omitted. The upper part of FIG. 2 is an enlarged partial view illustrating part of the plan view, in which wires extend from corresponding pixel electrodes to a driver and are positioned below a sealant. The lower part of FIG. 2 is a cross-sectional view illustrating the liquid crystal display device in the upper part of FIG. 2. The sealant is in contact with liquid crystal and an alignment film. Depending on a position at which the sealant is disposed, the sealant or liquid crystal may be in contact with wires or an overcoat layer although it is not shown in the drawing.

(Liquid Crystal Layer)

The liquid crystal layer of the liquid crystal display device of the present invention contains a liquid crystal composition containing at least one compound represented by General Formula (I).

[Chem. 2]

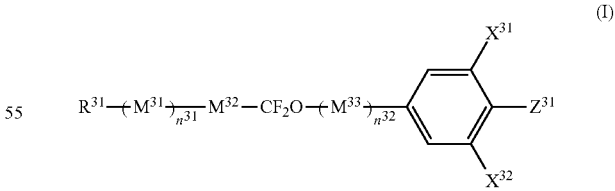

(in the formula, $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— moieties of the trans-1,4-cyclohexylene group are optionally substituted with —O— such that oxygen atoms do not directly adjoin each other, and one or two hydrogen atoms of the phenylene group are optionally substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is equal to 0, 1, or 2; in the case where $M^{31}$ is multiple, the multiple $M^{31}$'s are the same as or different from each other; and in the case where $M^{33}$ is multiple, the multiple $M^{38}$'s are the same as or different from each other).

In General Formula (I), in the case where the ring structure bonded to $R^{31}$ is a phenyl group (aromatic), $R^{31}$ is preferably a linear alkyl group having 1 to 5 carbon atoms, a linear alkoxy group having 1 to 4 (or more) carbon atoms, or an alkenyl group having 4 or 5 carbon atoms; in the case where the ring structure bonded to $R^{31}$ is a saturated ring such as cyclohexane, pyran, or dioxane, $R^{31}$ is preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{31}$ is preferably an alkyl group. In order to produce a liquid crystal display device in which the viscosity is small and which quickly responds, $R^{31}$ is preferably an alkenyl group. In order to give small viscosity and high nematic-isotropic phase transition temperature (Tni) and to make response speed faster, it is preferred that an alkenyl group of which the terminal is not an unsaturated bond be employed, and it is especially preferred that an alkenyl group having a methyl group bonded to the terminal thereof be employed. In terms of good solubility at low temperature, $R^{31}$ is preferably an alkoxy group in an approach; in another approach, various $R^{31}$'s are preferably allowed to be present in combination. For example, compounds of which $R^{31}$'s are alkyl groups or alkenyl groups having 2, 3, and 4 carbon atoms are preferably used in combination; also preferably compounds of which $R^{31}$'s are alkyl groups or alkenyl groups having 3 and 5 carbon atoms; and also preferably compounds of which $R^{31}$'s are alkyl groups or alkenyl groups having 3, 4, and 5 carbon atoms.

$M^{31}$ to $M^{33}$ are preferably any of the following rings.

[Chem. 3]

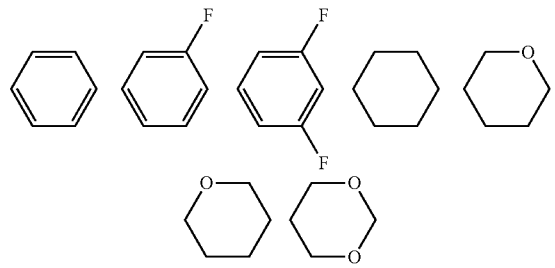

$M^{31}$ is preferably any of the following rings.

[Chem. 4]

$M^{31}$ is more preferably any of the following rings.

[Chem. 5]

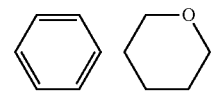

$M^{32}$ is preferably any of the following rings.

[Chem. 6]

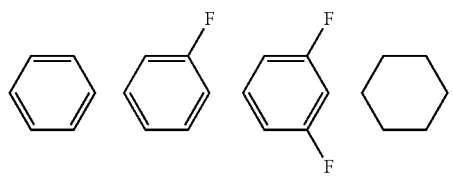

$M^{32}$ is more preferably any of the following rings.

[Chem. 7]

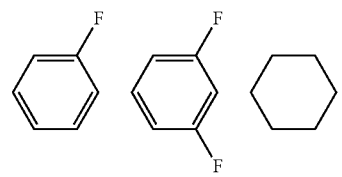

$M^{32}$ is further preferably any of the following rings.

[Chem. 8]

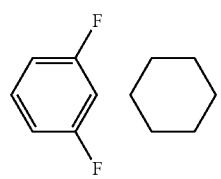

$M^{31}$ is preferably any of the following rings.

[Chem. 9]

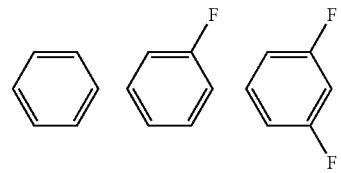

$M^{33}$ is more preferably any of the following rings.

[Chem. 10]

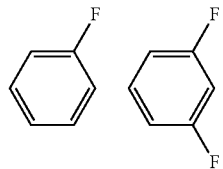

$M^{33}$ is further preferably any of the following rings.

[Chem. 11]

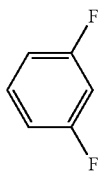

It is preferred that at least any one of $X^{31}$ and $X^{32}$ be a fluorine atom, and it is more preferred that both of them be fluorine atoms.

$Z^{31}$ is preferably a fluorine atom or a trifluoromethoxy group. In an embodiment, $X^{31}$, $X^{32}$, and $Z^{31}$ are as follows: $X^{31}$=F, $X^{32}$=F, and $Z^{31}$=F. In another embodiment, $X^{31}$, $X^{32}$, and $Z^{31}$ are as follows: $X^{31}$=F, $X^{32}$=H, and $Z^{31}$=F. In another embodiment, $X^{31}$, $X^{32}$, and $Z^{31}$ are as follows: $X^{31}$=F, $X^{32}$=H, and $Z^{31}$=OCF3. In another embodiment, $X^{31}$, $X^{32}$, and $Z^{31}$ are as follows: $X^{31}$=F, $X^{32}$=F, and $Z^{31}$=OCF3. In another embodiment, $X^{31}$, $X^{32}$, and $Z^{31}$ are as follows: $X^{31}$=H, $X^{32}$=H, and $Z^{31}$=OCF3.

$n^{31}$ is preferably 1 or 2; $n^{32}$ is preferably 0 or 1, and more preferably 0. $n^{31}+n^{32}$ is preferably 1 or 2, and more preferably 2.

In particular, the compound represented by General Formula (I) is preferably any of compounds represented by General Formulae (I-a) to (I-f).

[Chem. 12]

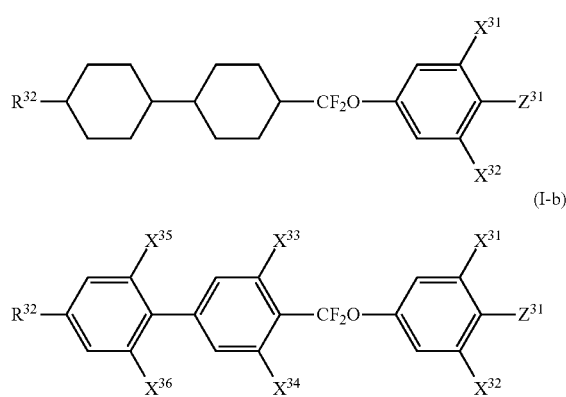

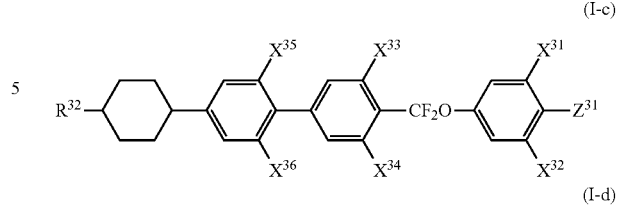

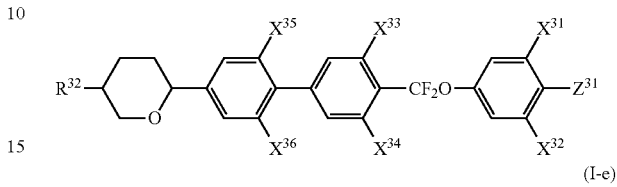

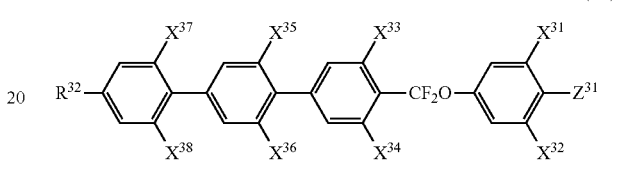

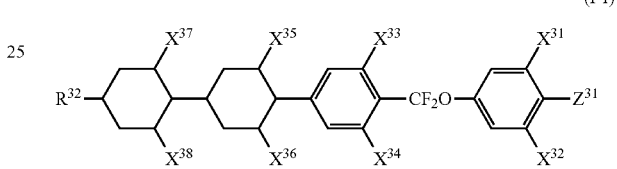

(in the formulae, $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; $Z^{31}$ represents a fluorine atom, a trifluoromethoxy group, or a trifluoromethyl group)

In each of General Formulae (Ia) to (If), in the case where the ring structure bonded to $R^{32}$ is a phenyl group (aromatic), $R^{32}$ is preferably a linear alkyl group having 1 to 5 carbon atoms, a linear alkoxy group having 1 to 4 (or more) carbon atoms, or an alkenyl group having 4 or 5 carbon atoms; in the case where the ring structure bonded to $R^{32}$ is a saturated ring such as cyclohexane, pyran, or dioxane, $R^{32}$ is preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{32}$ is preferably an alkyl group. In order to produce a liquid crystal display device in which the viscosity is small and which quickly responds, $R^{31}$ is preferably an alkenyl group. In order to give small viscosity and high nematic-isotropic phase transition temperature (Tni) and to make response speed faster, it is preferred that an alkenyl group of which the terminal is not an unsaturated bond be employed, and it is especially preferred that an alkenyl group having a methyl group bonded to the terminal thereof be employed. In terms of good solubility at low temperature, $R^{31}$ is preferably an alkoxy group in an approach; in another approach, various $R^{31}$'s are preferably allowed to be present in combination. For example, compounds of which $R^{31}$'s are alkyl groups or alkenyl groups having 2, 3, and 4 carbon atoms are preferably used in combination; also preferably compounds of which $R^{31}$'s are alkyl groups or alkenyl groups having 3 and 5 carbon atoms; and also preferably compounds of which $R^{31}$'s are alkyl groups or alkenyl groups having 3, 4, and 5 carbon atoms.

It is preferred that at least any one of $X^{31}$ and $X^{32}$ be a fluorine atom, and it is more preferred that both of them be fluorine atoms.

$Z^{31}$ is preferably a fluorine atom or a trifluoromethoxy group.

In an embodiment, $X^{31}$, $X^{32}$, and $Z^{31}$ are as follows: $X^{31}$=F, $X^{32}$=F, and $Z^{31}$=F. In another embodiment, $X^{31}$, $X^{32}$, and $Z^{31}$ are as follows: $X^{31}$=F, $X^{32}$=H, and $Z^{31}$=F. In another embodiment, $X^{31}$, $X^{32}$, and $Z^{31}$ are as follows; $X^{31}$=F, $X^{32}$=H, and $Z^{31}$=OCF3. In another embodiment, $X^{31}$, $X^{32}$, and $Z^{31}$ are as follows: $X^{31}$=F, $X^{32}$=F, and $Z^{31}$=OCF3. In another embodiment, $X^{31}$, $X^{32}$, and $Z^{31}$ are as follows: $X^{31}$=H, $X^{32}$=H, and $Z^{31}$=OCF3.

$n^{31}$ is preferably 1 or 2; $n^{32}$ is preferably 0 or 1, and more preferably 0. $n^{31}+n^{32}$ is preferably 1 or 2, and more preferably 2.

It is preferred that at least any one of $X^{33}$ and $X^{34}$ be a fluorine atom, and it is more preferred that both of them be fluorine atoms.

At least any one of $X^{35}$ and $X^{36}$ is preferably a fluorine atom; in the case where both of them are fluorine atoms, it is effective in an enhancement in $\Delta\in$, whereas it is not preferred in terms of Tni, solubility at low temperature, and the chemical stability of the composition used in a liquid crystal display device.

It is preferred that at least any one of $X^{37}$ and $X^{38}$ be a hydrogen atom, and it is also preferred that both of them be hydrogen atoms. In the case where at least any one of $X^{37}$ and $X^{38}$ is a fluorine atom, it is not preferred in terms of Tni, solubility at low temperature, and the chemical stability of the composition used in a liquid crystal display device.

One to eight compounds represented by General Formula (I) are preferably used, and especially preferably one to five. The amount thereof is preferably in the range of 3 to 50 mass %, and more preferably 5 to 40 mass %.

The liquid crystal composition used in the liquid crystal display device of the present invention preferably contains at least one compound selected from the group consisting of compounds represented by General Formulae (II-a) to (II-f).

[Chem. 13]

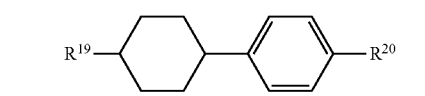
(II-a)

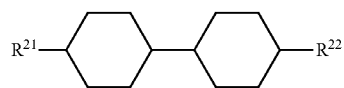
(II-b)

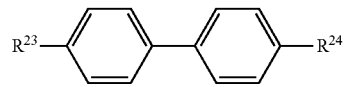
(II-c)

(II-d)

(II-e)

-continued

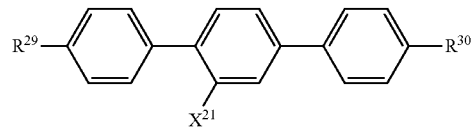
(II-f)

(in the formulae, $R^{19}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom)

In General Formulae (IIa) to (IIf), in the case where the ring structures bonded to $R^{19}$ to $R^{30}$ are phenyl groups (aromatics), $R^{19}$ to $R^{30}$ are each preferably a linear alkyl group having 1 to 5 carbon atoms, a linear alkoxy group having 1 to 4 (or more) carbon atoms, or an alkenyl group having 4 or 5 carbon atoms; in the case where the ring structures bonded to $R^{19}$ to $R^{30}$ are saturated rings such as cyclohexane, pyran, and dioxane, $R^{19}$ to $R^{30}$ are each preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{19}$ to $R^{30}$ are each preferably an alkyl group. In order to produce a liquid crystal display device in which the viscosity is small and which quickly responds, $R^{19}$ to $R^{30}$ are each preferably an alkenyl group. In order to give small viscosity and high nematic-isotropic phase transition temperature (Tni) and to make response speed faster, it is preferred that an alkenyl group of which the terminal is not an unsaturated bond be employed, and it is especially preferred that an alkenyl group having a methyl group bonded to the terminal thereof be employed. In terms of good solubility at low temperature, $R^{19}$ to $R^{30}$ are each preferably an alkoxy group in an approach; in another approach, various $R^{19}$'s to $R^{30}$'s are preferably allowed to be present in combination. For example, compounds of which $R^{19}$'s to $R^{30}$'s are alkyl groups or alkenyl groups having 2, 3, and 4 carbon atoms are preferably used in combination; also preferably compounds of which $R^{19}$'s to $R^{30}$'s are alkyl groups or alkenyl groups having 3 and 5 carbon atoms; and also preferably compounds of which $R^{19}$'s to $R^{30}$'s are alkyl groups or alkenyl groups having 3, 4, and 5 carbon atoms.

$R^{19}$ and $R^{20}$ are each preferably an alkyl group or an alkoxy group, and it is preferred that at least any one of them be an alkoxy group. It is more preferred that $R^{19}$ be an alkyl group and that $R^{20}$ be an alkoxy group. It is further preferred that $R^{19}$ be an alkyl group having 3 to 5 carbon atoms and that $R^{20}$ be an alkoxy group having 1 or 2 carbon atoms.

$R^{21}$ and $R^{22}$ are each preferably an alkyl group or an alkenyl group, and it is preferred that at least any one of them be an alkenyl group. In the case where that both of them are alkenyl groups, it is preferred in terms of an enhancement in response speed, whereas it is not preferred in terms of an improvement in the chemical stability of the composition used in a liquid crystal display device.

At least any one of $R^{23}$ and $R^{24}$ is preferably an alkyl group having 1 to 5 carbon atoms, an alkoxy group having 1 to 5 carbon atoms, or an alkenyl group having 4 or 5 carbon atoms. It is preferred that at least any one of $R^{23}$ and $R^{24}$ be an alkenyl group for a good balance between a response speed and Tni, and it is preferred that at least any one of $R^{23}$ and $R^{24}$ be an alkoxy group for a good balance between a response speed and solubility at low temperature.

At least any one of $R^{25}$ and $R^{26}$ is preferably an alkyl group having 1 to 5 carbon atoms, an alkoxy group having 1 to 5 carbon atoms, or an alkenyl group having 2 to 5 carbon atoms. It is preferred that at least any one of $R^{25}$ and $R^{26}$ be an alkenyl group for a good balance between a response speed and Tni, and it is preferred that at least any one of $R^{25}$ and $R^{26}$ be an alkoxy group for a good balance between a response speed and solubility at low temperature. It is more preferred that $R^{25}$ be an alkenyl group and that $R^{26}$ be an alkyl group. It is also preferred that $R^{25}$ be an alkyl group and that $R^{26}$ be an alkoxy group.

At least any one of $R^{27}$ and $R^{28}$ is preferably an alkyl group having 1 to 5 carbon atoms, an alkoxy group having 1 to 5 carbon atoms, or an alkenyl group having 2 to 5 carbon atoms. It is preferred that at least any one of $R^{27}$ and $R^{28}$ be an alkenyl group for a good balance between a response speed and Tni, and it is preferred that at least any one of $R^{27}$ and $R^{28}$ be an alkoxy group for a good balance between a response speed and solubility at low temperature. It is more preferred that $R^{27}$ be an alkyl group or an alkenyl group and that $R^{28}$ be an alkyl group. It is also preferred that $R^{27}$ be an alkyl group and that $R^{28}$ be an alkoxy group. It is especially preferred that $R^{27}$ be an alkyl group and that $R^{28}$ be an alkyl group.

$X^{21}$ is preferably a fluorine atom.

At least any one of $R^{29}$ and $R^{30}$ is preferably an alkyl group having 1 to 5 carbon atoms or an alkenyl group having 4 or 5 carbon atoms. It is preferred that at least any one of $R^{29}$ and $R^{30}$ be an alkenyl group for a good balance between a response speed and Tni, and it is preferred that at least any one of $R^{29}$ and $R^{30}$ be an alkyl group for high reliability. It is more preferred that $R^{29}$ be an alkyl group or an alkenyl group and that $R^{30}$ be an alkyl group or an alkenyl group. It is also preferred that $R^{29}$ be an alkyl group and that $R^{30}$ be an alkenyl group. It is also preferred that $R^{29}$ be an alkyl group and that $R^{30}$ be an alkyl group.

One to ten of compounds represented by General Formulae (II-a) to (II-f) are preferably used, and especially preferably one to eight. The amount thereof is preferably in the range of 5 to 80 mass %, more preferably 10 to 70 mass %, and especially preferably 20 to 60 mass %.

The liquid crystal composition layer of the liquid crystal display device of the present invention can further contain at least one compound selected from the group consisting of compounds represented by General Formulae (III-a) to (III-f).

[Chem. 14]

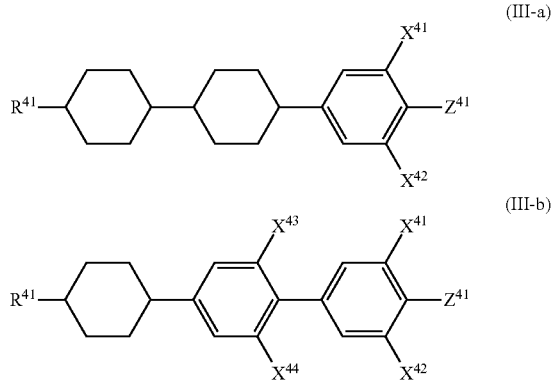
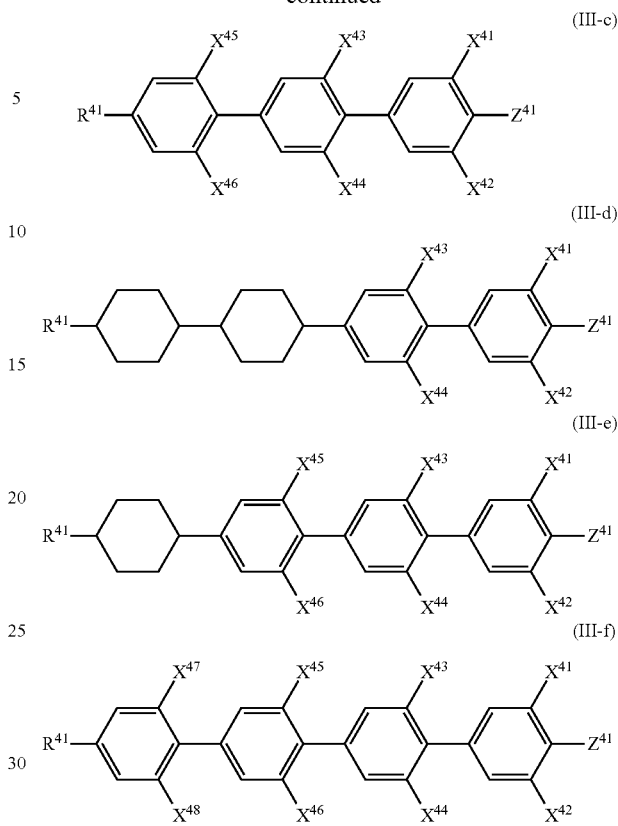

(in the formulae, $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; $Z^{41}$ represents a fluorine atom, a trifluoromethoxy group, or a trifluoromethyl group)

In each of General Formulae (IIIa) to (IIIf), in the case where the ring structure bonded to $R^{41}$ is a phenyl group (aromatic), $R^{41}$ is preferably a linear alkyl group having 1 to 5 carbon atoms, a linear alkoxy group having 1 to 4 (or more) carbon atoms, or an alkenyl group having 4 or 5 carbon atoms; in the case where the ring structure bonded to $R^{41}$ is a saturated ring such as cyclohexane, pyran, or dioxane, $R^{41}$ is preferably a linear alkyl group having 1 to 5 carbon atoms, a linear alkoxy group having 1 to 4 (or more) carbon atoms, or a linear alkenyl group having 2 to 5 carbon atoms.

In view of good chemical stability to heat and light, $R^{41}$ is preferably an alkyl group. In order to produce a liquid crystal display device in which the viscosity is small and which quickly responds, $R^{41}$ is preferably an alkenyl group. In order to give small viscosity and high nematic-isotropic phase transition temperature (Tni) and to make response speed faster, it is preferred that an alkenyl group of which the terminal is not an unsaturated bond be employed, and it is especially preferred that an alkenyl group having a methyl group bonded to the terminal thereof be employed. In terms of good solubility at low temperature, $R^{41}$ is preferably an alkoxy group in an approach; in another approach, various $R^{41}$'s are preferably allowed to be present in combination. For example, compounds of which $R^{41}$'s are alkyl groups or alkenyl groups having 2, 3, and 4 carbon atoms are preferably used in combination; also preferably compounds of which $R^{41}$'s are alkyl groups or alkenyl groups having 3 and 5 carbon atoms; and also preferably compounds of which $R^{41}$'s are alkyl groups or alkenyl groups having 3, 4, and 5 carbon atoms.

It is preferred that at least any one of $X^{41}$ and $X^{42}$ be a fluorine atom, and it is more preferred that both of them be fluorine atoms.

$Z^{41}$ is preferably a fluorine atom or a trifluoromethoxy group.

In an embodiment, $X^{41}$, $X^{42}$, and $Z^{41}$ are as follows: $X^{41}$=F, $X^{42}$=F, and $Z^{41}$=F. In another embodiment, $X^{41}$, $X^{42}$, and $Z^{41}$ are as follows: $X^{41}$=F, $X^{42}$=H, and $Z^{41}$=F. In another embodiment, $X^{41}$, $X^{42}$, and $Z^{41}$ are as follows: $X^{41}$=F, $X^{42}$=H, and $Z^{41}$=OCF3. In another embodiment, $X^{41}$, $X^{42}$, and $Z^{41}$ are as follows: $X^{41}$=F, $X^{42}$=F, and $Z^{41}$=OCF3. In another embodiment, $X^{41}$, $X^{42}$, and $Z^{41}$ are as follows: $X^{41}$=H, $X^{42}$=H, and $Z^{41}$=OCF3.

At least any one of $X^{43}$ and $X^{44}$ is preferably a fluorine atom. In order to have a large $\Delta\in$, it is preferred that both of them be fluorine atoms; in order to improve solubility at low temperature, it is not preferred that both of them be fluorine atoms.

It is preferred that at least any one of $X^{45}$ and $X^{46}$ be a hydrogen atom, and it is also preferred that both of them be hydrogen atoms. The presence of excess of fluorine atoms is not preferred in terms of Tni, solubility at low temperature, and the chemical stability of the composition used in a liquid crystal display device.

It is preferred that at least any one of $X^{47}$ and $X^{48}$ be a hydrogen atom, and it is also preferred that both of them be hydrogen atoms. In the case where at least any one of $X^{47}$ and $X^{48}$ is a fluorine atom, it is not preferred in terms of Tni, solubility at low temperature, and the chemical stability of the composition used in a liquid crystal display device.

One to ten compounds are preferably selected from the group consisting of compounds represented by General Formulae (III-a) to (III-f), and more preferably one to eight compounds. The amount thereof is preferably in the range of 5 to 50 mass %, and more preferably 10 to 40 mass %.

The liquid crystal composition used in the liquid crystal composition layer of the liquid crystal display device of the present invention preferably has $\Delta\in$ of not less than +1.5 at 25° C. For high response speed, the $\Delta\in$ is preferably in the range of +1.5 to +4.0, and more preferably +1.5 to +3.0. For driving at low voltage, the $\Delta\in$ is preferably in the range of +8.0 to 418.0, and more preferably +10.0 to +15.0. The liquid crystal composition preferably has $\Delta$n ranging from 0.08 to 0.14, and more preferably from 0.09 to 0.13 at 25° C. In particular, the $\Delta$n is preferably from 0.10 to 0.13 for a thin cell gap and preferably from 0.08 to 0.10 for a thick cell gap. The liquid crystal composition preferably has η ranging from 5 to 45 mPa·s, more preferably 5 to 25 mPa·s, and especially preferably 10 to 20 mPa·s at 20° C. The liquid crystal composition preferably has $T_{ni}$ ranging from 60° C. to 120° C., more preferably 70° C. to 100° C., and especially preferably 70° C. to 85° C.

The liquid crystal composition used in the liquid crystal display device of the present invention may contain, for example, general nematic liquid crystal, smectic liquid crystal, and cholesteric liquid crystal in addition to the above-mentioned compounds. The amount of a chlorine-atom-containing compound in the liquid crystal composition is preferably not more than 5%, also preferably not more than 3%, also preferably not more than 1%, and also preferably not more than 0.5%; and it is also preferred that the liquid crystal composition be substantially free from a chlorine-atom-containing compound. The term "substantially free from a chlorine-atom-containing compound" refers to that only a compound unavoidably containing a chlorine atom, such as a compound generated as an impurity in production of another compound, is contained in the liquid crystal composition.

The liquid crystal composition used in the liquid crystal display device of the present invention can contain at least one polymerizable compound for production of a liquid crystal display device of a PS mode, a PSA mode involving use of a horizontal electric field, or a PSVA mode involving use of a horizontal electric field. Examples of a usable polymerizable compound include photopolymerizable monomers which are polymerized by being irradiated with energy rays such as light; in particular, examples of the polymerizable compound include polymerizable compounds having a structure with a liquid crystal molecular framework in which multiple six-membered rings are bonded to each other, such as biphenyl derivatives and terphenyl derivatives. Specifically, the polymerizable compound is preferably a difunctional monomer represented by General Formula (V).

[Chem. 15]

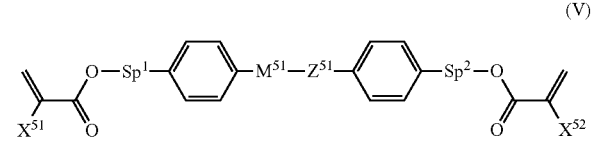

(V)

(in the formula, $X^{51}$ and $X^{52}$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer from 1 to 7, and the oxygen atom is bonded to an aromatic ring); $Z^{51}$ represents —OCH$_2$—, —CH$_2$O—, —COO—, —OCO—, —CF$_2$O—, —OCF$_2$—, —CH$_2$CH$_2$—, —CF$_2$CF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CY$^1$=CY$^2$— (where Y$^1$ and Y$^2$ each independently represent a fluorine atom or a hydrogen atom), —C≡C—, or a single bond; and $M^{51}$ represents a 1,4-phenylene group, a trans-1,4-cyclohexylene group, or a single bond, and in each 1,4-phenylene group in the formula, any hydrogen atom is optionally substituted with a fluorine atom)

Diacrylate derivatives in which $X^{51}$ and $X^{52}$ each represent a hydrogen atom and dimethacrylate derivatives in which $X^{51}$ and $X^{52}$ are each a methyl group are preferred, and compounds in which one of $X^{51}$ and $X^{52}$ represents a hydrogen atom and in which the other one thereof represents a methyl group are also preferred. Among these compounds, the rate of polymerization is the highest in diacrylate derivatives and the lowest in dimethacrylate derivatives, and the rate of polymerization of unsymmetrical compounds is intermediate therebetween. Hence, an appropriate compound can be employed on the basis of the intended application. In PSA display devices, dimethacrylate derivatives are especially preferred.

$Sp^1$ and $Sp^2$ each independently represent a single bond, an alkylene group having 1 to 8 carbon atoms, or —O—

$(CH_2)_s$—; in an application to PSA display devices, at least one of $Sp^1$ and $Sp^2$ is preferably a single bond, and compounds in which $Sp^1$ and $Sp^2$ each represent a single bond and compounds in which one of $Sp^1$ and $Sp^2$ is a single bond and in which the other one thereof represents an alkylene group having 1 to 8 carbon atoms or —O—$(CH_2)_s$— are preferred. In this case, an alkyl group having a carbon atom number of 1 to 4 is preferably employed, and s preferably ranges from 1 to 4.

$Z^{51}$ is preferably —OCH$_2$—, —CH$_2$O—, —COO—, —OCO—, —CF$_2$O—, —OCF$_2$—, —CH$_2$CH$_2$—, —CF$_2$CF$_2$—, or a single bond; more preferably —COO—, —OCO—, or a single bond; and especially preferably a single bond.

$M^{51}$ represents a 1,4-phenylene group of which any hydrogen atom is optionally substituted with a fluorine atom, a trans-1,4-cyclohexylene group, or a single bond; and a 1,4-phenylene group and a single bond are preferred. In the case where $M^{51}$ does not represent a single bond but represents a ring structure, $Z^{51}$ preferably represents a linking group as well as a single bond; in the case where $M^{51}$ represents a single bond, $Z^{51}$ is preferably a single bond.

From these viewpoints, a preferred ring structure between $Sp^1$ and $Sp^2$ in General Formula (V) is particularly as follows.

In General Formula (V), in the case where $M^{51}$ represents a single bond and where the ring structure consists of two rings, the ring structure is preferably represented by any of Formulae (Va-1) to (Va-5), more preferably Formulae (Va-1) to (Va-3), and especially preferably Formula (Va-1).

[Chem. 16]

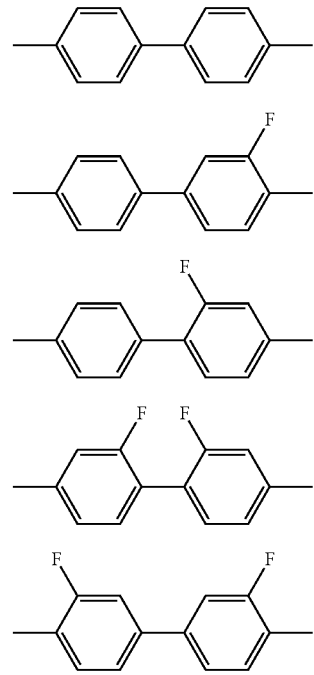

(in the formulae, the two ends of each structure are bonded to $Sp^1$ and $Sp^2$, respectively)

Polymerizable compounds having such skeletons enable uneven display to be reduced or eliminated in PSA liquid crystal display devices because such polymerizable compounds have optimum alignment regulating force after being polymerized and thus produce a good alignment state.

Accordingly, the polymerizable compound is especially preferably any of compounds represented by General Formulae (V-1) to (V-4), and most preferably the compound represented by General. Formula (V-2).

[Chem. 17]

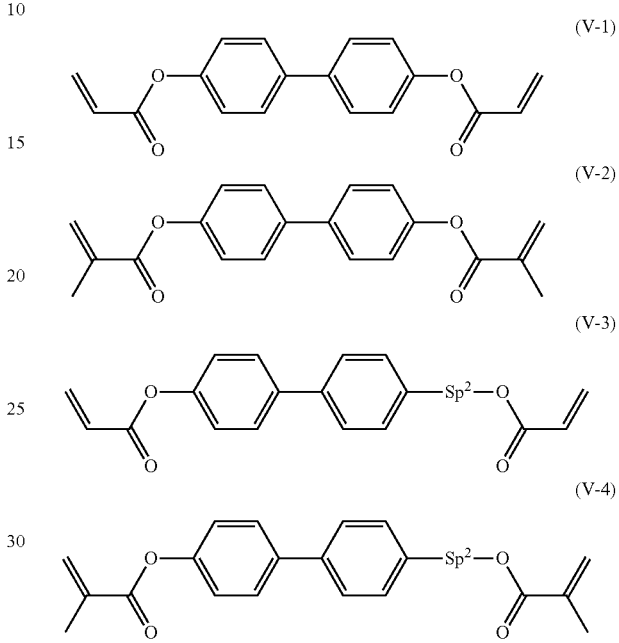

(in the formulae, $Sp^2$ represents an alkylene group having 2 to 5 carbon atoms)

In the case where the polymerizable compound is added to the liquid crystal composition used in the liquid crystal display device of the present invention, polymerization is carried out even without a polymerization initiator; however, a polymerization initiator may be used to promote the polymerization. Examples of the polymerization initiator include benzoin ethers, benzophenones, acetophenones, benzyl ketals, and acyl phosphine oxides.

In the polymerizable-compound-containing liquid crystal composition used in the liquid crystal display device of the present invention, the polymerizable compound is polymerized by being irradiated with ultraviolet, so that liquid crystal molecules can be aligned; thus, such a liquid crystal composition is used in liquid crystal display devices in which the birefringence of the liquid crystal composition is utilized for control of the amount of light that is to be transmitted. Such a liquid crystal composition is useful for liquid crystal display devices, such as an AM-LCD (active-matrix liquid crystal display device), a TN (twisted nematic liquid crystal display device), an STN-LCD (super twisted nematic liquid crystal display device), an OCB-LCD, and an IPS-LCD (in-plane switching liquid crystal display device), particularly useful for an AM-LCD, and can be used in transmissive or reflective liquid crystal display devices.

(Curable Resin Composition)

The sealant used in the liquid crystal display device of the present invention is the cured product of a curable resin composition containing a compound having at least one (meth)acrylic group and at least one epoxy group per molecule. Any compound having at least one (meth)acrylic group and at least one epoxy group per molecule can be used; examples thereof include (meth)acrylic acid-modified epoxy resins and urethane-modified (meth)acrylic epoxy resins.

(1) (Meth)Acrylic Acid-Modified Epoxy Resin

Any (meth)acrylic acid-modified epoxy resin can be used; for example, it can be produced by the reaction of (meth) acrylic acid with an epoxy resin in the presence of a basic catalyst in accordance with routine procedures.

The (meth)acrylic acid-modified epoxy resin is, for example, a partially (meth)acrylated novolac epoxy resin or bisphenol epoxy resin; for instance, suitable epoxy resins are biphenyl epoxy resins, naphthalene epoxy resins, tris(hydroxyphenyl)alkyl epoxy resins, and tetrakis(hydroxyphenyl)alkyl epoxy resins.

Any epoxy compound can be used as a material for synthesis of the (meth)acrylic acid-modified epoxy resin. Examples thereof include bisphenol A epoxy resins, bisphenol E epoxy resins, bisphenol F epoxy resins, bisphenol S epoxy resins, 2,2'-diallyl bisphenol A epoxy resins, hydrogenated bisphenol epoxy resins, polyoxypropylene bisphenol A epoxy resins, propylene-oxide-added bisphenol A epoxy resins, resorcinol epoxy resins, biphenyl epoxy resins, sulfide epoxy resins, diphenyl ether epoxy resins, dicyclopentadiene epoxy resins, naphthalene epoxy resins, phenol novolac epoxy resins, cresol novolac epoxy resins, trisphenol novolac epoxy resins, dicyclopentadiene novolac epoxy resins, biphenyl novolac epoxy resins, naphthalene phenol novolac epoxy resins, glycidylamine epoxy resins, alkyl polyol epoxy resins, rubber-modified epoxy resins, glycidyl ester compounds, bisphenol A episulphide resins, and alicyclic epoxy resins. Among these, bisphenol A epoxy resins, bisphenol E epoxy resins, bisphenol F epoxy resins, resorcinol epoxy resins, phenol novolac epoxy resins, and diphenyl ether epoxy resins are preferred.

Examples of commercially available products of the epoxy compounds used as a material for synthesis of epoxy (meth)acrylate include bisphenol A epoxy resins such as jER828EL and jER1004 (each manufactured by Mitsubishi Chemical Corporation) and EPICLON 850-S (manufactured by DIC Corporation); bisphenol F epoxy resins such as jER806 and jER4004 (each manufactured by Mitsubishi Chemical Corporation); bisphenol E epoxy resins such as R-710; bisphenol S epoxy resins such as EPICLON EXA1514 (manufactured by DIC Corporation); 2,2'-diallyl bisphenol A epoxy resins such as RE-810M (manufactured by Nippon Kayaku Co., Ltd.); hydrogenated bisphenol epoxy resins such as EPICLON EXA7015 (manufactured by DIC Corporation); propylene-oxide-added bisphenol A epoxy resins such as EP-4000S (manufactured by ADEKA CORPORATION); resorcinol epoxy resins such as EX-201 (manufactured by Nagase ChemteX Corporation); biphenyl epoxy resins such as JERYX-4000H (manufactured by Mitsubishi Chemical Corporation); sulfide epoxy resins such as YSLV-50TE (manufactured by Nippon Steel Chemical Co., Ltd.); biphenyl ether epoxy resins such as YSLV-80DE (manufactured by Nippon Steel Chemical Co., Ltd.); dicyclopentadiene epoxy resins such as EP-4088S (manufactured by ADEKA CORPORATION); naphthalene epoxy resins such as EPICLON HP4032 and EPICLON EXA-4700 (each manufactured by DIC Corporation); phenol novolac epoxy resin such as EPICLON N-740, EPICLON N-770, and EPICLON N-775 (each manufactured by DIC Corporation) and jER152 and jER154 (each manufactured by Mitsubishi Chemical Corporation); o-cresol novolac epoxy resins such as EPICLON N-670-EXP-S (manufactured by DIC Corporation); cresol novolac epoxy resins such as EPICLON N660, EPICLON N665, EPICLON N670, EPICLON N673, EPICLON N680, EPICLON N695, EPICLON N665EXP, and EPICLON N672EXP (each manufactured by DIC Corporation); dicyclopentadiene novolac epoxy resins such as EPICLON HP7200 (manufactured by DIC Corporation); biphenyl novolac epoxy resins such as NC-3000P (manufactured by Nippon Kayaku Co., Ltd.); naphthalene phenol novolac epoxy resins such as ESN-165S (manufactured by Nippon Steel Chemical Co., Ltd.); glycidylamine epoxy resins such as jER630 (manufactured by Mitsubishi Chemical Corporation), EPICLON 430 (manufactured by DIC Corporation), and TETRAD-X (manufactured by MITSUBISHI GAS CHEMICAL COMPANY, INC.); alkyl polyol epoxy resins such as ZX-1542 (manufactured by Nippon Steel Chemical Co., Ltd.), EPICLON 726 (manufactured by DIC Corporation), EPOLIGHT 80MFA (manufactured by kyoeisha Chemical Co., Ltd.), and DENACOL EX-611 (manufactured by Nagase ChemteX Corporation); rubber-modified epoxy resins such as YR-450 and YR-207 (each manufactured by Nippon Steel Chemical Co., Ltd.) and Epolead PB (manufactured by Daicel Corporation); glycidyl ester compounds such as DENACOL EX-147 (manufactured by Nagase ChemteX Corporation); bisphenol A episuiphide resins such as jERYL-7000 (manufactured by Mitsubishi Chemical Corporation); and YDC-1312, YSLV-80XY, and YSLV-90CR (each manufactured by Nippon Steel Chemical Co., Ltd.), XAC4151 (manufactured by Asahi Kasei Corp.), jER1031 and jER1032 (each manufactured by Mitsubishi Chemical Corporation), EXA-7120 (manufactured by DIC Corporation), and TEPIC (manufactured by Nissan Chemical Industries, Ltd.). Any alicyclic epoxy resin can be used; examples of commercially available products thereof include Celloxide 2021, Celloxide 2080, Celloxide 3000, Epolead GT300, and EHPE (each manufactured by Daicel Corporation).

In particular, for instance, a resorcinol epoxy acrylate which is the epoxy (meth)acrylate can be produced by allowing 360 parts by weight of a resorcinol epoxy resin ("EX-201" manufactured by Nagase ChemteX Corporation), 2 parts by weight of p-methoxyphenol as a polymerization inhibitor, 2 parts by weight of triethylamine as a reaction catalyst, and 210 parts by weight of acrylic acid to react with each other for 5 hours under ref lux with stirring at 90° C. while air is supplied. Examples of commercially available products of the epoxy (meth)acrylate include EBECRYL 860, EBECRYL 1561, EBECRYL 3700, EBECRYL 3600, EBECRYL 3701, EBECRYL 3703, EBECRYL 3200, EBECRYL 3201, EBECRYL 3702, EBECRYL 3412, EBECRYL 860, EBECRYL RDX63182, EBECRYL 6040, and EBECRYL 3800 (each manufactured by DAICEL-CYTEC Company, Ltd.); EA-1020, EA-1010, EA-5520, EA-5323, EA-CHD, and EMA-1020 (each manufactured by Shin Nakamura Chemical Co., Ltd.); Epoxy ester M-600A, Epoxy ester 40EM, Epoxy ester 70PA, Epoxy ester 200PA, Epoxy ester 80MFA, Epoxy ester 3002M, Epoxy ester 3002A, Epoxy ester 1600A, Epoxy ester 3000M, Epoxy ester 3000A, Epoxy ester 200EA, and Epoxy ester 400EA (each manufactured by kyoeisha Chemical Co., Ltd.); and Denacol Acrylate DA-141, Denacol Acrylate DA-314, and Denacol Acrylate DA-911 (each manufactured by Nagase ChemteX Corporation).

(2) Urethane-Modified (Meth)Acrylic Epoxy Resin

The urethane-modified (meth)acrylic epoxy resin can be, for example, produced by the following technique: a technique in which polyol is allowed to react with di- or higher functional isocyanate and the resulting product is allowed to react with a (meth)acrylic monomer having a hydroxyl group and with glycidol, a technique in which di- or higher functional isocyanate is allowed to react with a (meth) acrylic monomer having a hydroxyl group and with glycidol without use of polyol, or a technique in which (meth) acrylate having an isocyanate group is allowed to react with glycidol. In particular, for example, 1 mol of trimethylolpropane is allowed to react with 3 mol of isophorone diisocyanate in the presence of a tin catalyst; and an isocyanate group remaining in the resulting compound is allowed to react with a hydroxyethyl acrylate which is an acrylic monomer having a hydroxyl group and with glycidol which is an epoxy having a hydroxyl group, thereby being able to produce the urethane-modified (meth)acrylic epoxy resin.

The polyol is not particularly limited; examples thereof include ethylene glycol, glycerine, sorbitol, trimethylolpropane, and (poly)propylene glycol.

Any isocyanate can be used provided that it is di- or higher functional; examples thereof include isophorone diisocyanate, 2,4-tolylene diisocyanate, 2,6-tolylene diisocyanate, hexamethylene diisocyanate, trimethylhexamethylene diisocyanate, diphenylmethane-4,4'-diisocyanate (MDI), hydrogenated MDI, polymeric MDI, 1,5-naphthalene diisocyanate, norbornane diisocyanate, tolidine diisocyanate, xylylene diisocyanate (XDI), hydrogenated XDI, lysine diisocyanate, triphenylmethane triisocyanate, tris(isocyanatophenyl) thiophosphate, tetramethylxylene diisocyanate, and 1,6,10-undecane triisocyanate.

The (meth)acrylic monomer having a hydroxyl group is not particularly limited. Examples of a monomer of which the molecules each have one hydroxyl group include hydroxyethyl (meth)acrylate, hydroxypropyl (meth)acrylate, and hydroxybutyl (meth)acrylate; and examples of a monomer of which the molecules each have two or more hydroxyl groups include epoxy (meth)acrylates such as bisphenol A-modified epoxy (meth)acrylate. These may be used alone or in combination.

In the curable resin composition, the ratio of a (meth) acrylic group to an epoxy group (acryl:epoxy) is preferably from 40:60 to 95:5. In the case where the equivalent ratio of a (meth)acrylic group is less than 40, photoreactivity is decreased with the result that irradiating the sealant with light after adjustment of a gap cannot give initial temporary curing and that components of the sealant also greatly flow into liquid crystal in some cases; in the case where the equivalent ratio exceeds 95, adhesiveness and moisture permeability may become insufficient. The equivalent ratio is more preferably from 50:50 to 80:20.

The compound having at least one (meth)acrylic group and at least one epoxy group per molecule preferably has a hydrogen-bonding group in order to reduce compatibility with liquid crystal for elimination of contamination and to prevent problematic defective display such as voids, uneven alignment, and screen burn-in; for example, it is preferred that the compound have a hydroxyl group and/or a urethane bond.

The compound having at least one (meth)acrylic group and at least one epoxy group per molecule preferably has at least one molecular skeleton selected from a biphenyl skeleton, a naphthalene skeleton, a bisphenol skeleton, and a partially (meth)acrylated novolac epoxy resin. It can enhance thermal resistance of the curable resin composition in the present invention.

The compound having at least one (meth)acrylic group and at least one epoxy group per molecule preferably has a number average molecular weight of 300 or more. A number average molecular weight of less than 300 causes components of the sealant to flow into liquid crystal and results in easily disrupting molecular alignment in some cases. The number average molecular weight is preferably 3000 or less. A number average molecular weight of greater than 3000 may cause viscosity control to be difficult in some cases.

In use of the compound having at least one (meth)acrylic group and at least one epoxy group per molecule as a curable resin, a curable resin composition of the present invention is cured and then subjected to infrared spectroscopy, and the infrared spectroscopy shows an absorption peak of a carbonyl group derived from a (meth)acrylic group. If an epoxy group and a hydroxyl group derived from the epoxy group are present, the absorption peaks thereof can be also observed.

The curable resin composition containing the compound having at least one (meth)acrylic group and at least one epoxy group per molecule preferably has a hydrogen-bonding functional group value from $3 \times 10^{-3}$ to $5 \times 10^{-3}$ mol/g. In such a curable resin composition, hydrogen bonds are formed in molecules; hence, in the case where the curable resin composition is used as a sealant, the composition is less likely to flow into liquid crystal before and after curing thereof and therefore hardly contaminates liquid crystal, which leads to a reduction in problematic defective display such as voids, uneven alignment, and screen burn-in. Thus, such a curable resin composition is preferred.

The hydrogen bonds are formed by compounds having functional groups or residues having hydrogen-bonding properties, e.g., compounds having functional groups such as a —OH group, a —NH2 group, a —NHR group (R represents aromatics, aliphatic hydrocarbons, or derivatives thereof), a —COOH group, a —CONH2 group, and a —NHOH group or compounds having residues in their molecules, such as a —NHCO— bond, a —NH— bond, a —CONHCO— bond, and a —NH—NH— bond. The above-mentioned hydrogen-bonding functional group value is a value which can be obtained from Equation 1 in the case where one type of the compounds having hydrogen-bonding functional groups is used.

Hydrogen-bonding Functional Group Value ($HX$) (mol/g)=(Number of Hydrogen-bonding Functional Groups in Compound $X$ per Molecule)/ (Molecular Weight of Compound $X$)    (Equation 1)

In the case where the compound having a hydrogen-bonding functional group is a mixture of multiple resins, the hydrogen-bonding functional group value can be obtained by distribution based on the amount of each compound having a hydrogen-bonding functional group per unit weight (weight fraction). For example, if the compound having a hydrogen-bonding functional group consists of a compound A, a compound B, and a compound C, the hydrogen-bonding functional group value is represented by Equation 2.

Hydrogen-bonding Functional Group Value ($HABC$)=$H_A P_A + H_B P_B + H_C P_C$    (Equation 2)

($P\alpha$ represents the weight fraction of a compound $\alpha$)

A hydrogen-bonding functional group value of less than $3 \times 10^{-3}$ mol/g causes components of the curable resin composition to flow into liquid crystal and results in easily disrupting alignment of liquid crystal molecules, and a hydrogen-bonding functional group value of greater than $5 \times 10^{-3}$ mol/g enhances the moisture permeability of the cured product and results in easy intrusion of moisture into a liquid crystal display device.

A single compound having a hydrogen-bonding functional group may be used so that the hydrogen-bonding functional group value is within the above-mentioned range, or two or more compounds having hydrogen-bonding functional groups may be used in combination so that the hydrogen-bonding functional group value is adjusted to be within the above-mentioned range. In other words, the average of the hydrogen-bonding functional group values of compounds having hydrogen-bonding functional groups, which are to be used, may be within the above-mentioned range.

The curable resin composition containing the compound having at least one (meth)acrylic group and at least one epoxy group per molecule preferably has a volume resistivity of not less than $1\times10^{13}$ Ω·cm after curing. A volume resistivity of less than $1\times10^{13}$ Ω·cm shows that a sealant contains an ionic impurity, and use of such a sealant causes ionic impurities to flow into liquid crystal during application of electricity, which results in a decrease in the voltage holding ratio (VHR) of the liquid crystal layer, an increase in ion density, and the occurrence of defective displays such as voids, uneven alignment, and screen burn-in.

The curable resin composition containing the compound having at least one (meth)acrylic group and at least one epoxy group per molecule preferably has a specific resistance from $1.0\times10^{6}$ to $1.0\times10^{10}$ Ω·cm before curing. At a specific resistance of less than $1.0\times10^{6}$ Ω·cm, a sealant containing such a curable resin composition flows into liquid crystal, which causes a decrease in the voltage holding ratio (VHR) of the liquid crystal layer, an increase in ion density, and defective displays such as voids, uneven alignment, and screen burn-in. A specific resistance of greater than $1.0\times10^{10}$ Ω·cm may impair adhesion to a substrate.

The curable resin composition containing the compound having at least one (meth)acrylic group and at least one epoxy group per molecule may contain a resin having a (meth)acryloyloxy group and/or a resin having an epoxy group; in particular, resins explained in "Resin Having (Meth)acryloyloxy Group" and "Resin Having Epoxy Group" which will be described later can be used. In any case of using such resins, the preferred upper limit of the content ratio of the epoxy group to the total of the (meth) acrylic group and the epoxy group is 40 mol %. At a ratio exceeding 40 mol %, the solubility of the composition in liquid crystal becomes excessive and may impair display characteristics.

(Resin Having (Meth)Acryloyloxy Group)

The resin having a (meth)acryloyloxy group refers to the following resins: for example, ester compounds produced by the reaction of a compound having a hydroxyl group with a (meth)acrylic acid and urethane (meth)acrylates produced by the reaction of a (meth)acrylic acid derivative having a hydroxyl group with isocyanate.

(1) Ester Compounds Produced by Reaction of Compound Having Hydroxyl Group with (Meth)Acrylic Acid Any ester compound produced by the reaction of a compound having a hydroxyl group with a (meth)acrylic acid can be used. Examples of monofunctional ester compounds include 2-hydroxyethyl (meth)acrylate, 2-hydroxypropyl (meth)acrylate, 4-hydroxybutyl (meth)acrylate, 2-hydroxybutyl (meth)acrylate, isobutyl (meth)acrylate, t-butyl (meth)acrylate, isooctyl (meth)acrylate, lauryl (meth)acrylate, stearyl (meth)acrylate, isobornyl (meth)acrylate, cyclohexyl (meth)acrylate, 2-methoxyethyl (meth)acrylate, methoxyethylene glycol (meth)acrylate, 2-ethoxyethyl (meth)acrylate, tetrahydrofurfuryl (meth)acrylate, benzyl (meth)acrylate, ethylcarbitol (meth)acrylate, phenoxyethyl (meth)acrylate, phenoxydiethylene glycol (meth)acrylate, phenoxypolyethylene glycol (meth)acrylate, methoxypolyethylene glycol (meth)acrylate, 2,2,2-trifluoroethyl (meth) acrylate, 2,2,3,3-tetrafluoropropyl (meth)acrylate, 1H,1H, 5H-octafluoropentyl (meth)acrylate, imide (meth)acrylate, methyl (meth)acrylate, ethyl (meth)acrylate, n-butyl (meth) acrylate, propyl (meth)acrylate, n-butyl (meth)acrylate, cyclohexyl (meth)acrylate, 2-ethylhexyl (meth)acrylate, n-octyl (meth)acrylate, isononyl (meth)acrylate, isomyristyl (meth)acrylate, 2-butoxyethyl (meth)acrylate, 2-phenoxyethyl (meth)acrylate, bicyclopentenyl (meth)acrylate, isodecyl (meth)acrylate, diethylaminoethyl (meth)acrylate, dimethylaminoethyl (meth)acrylate, 2-(meth)acryloyloxyethyl succinic acid, 2-(meth)acryloyloxyethyl hexahydrophthalic acid, 2-(meth)acryloyloxyethyl 2-hydroxypropyl phthalate, glycidyl (meth)acrylate, and 2-(meth)acryloyloxyethyl phosphate.

Among the ester compounds produced by the reaction of a compound having a hydroxyl group with a (meth)acrylic acid, any difunctional ester compound can be used; examples thereof include 1,4-butanediol di(meth)acrylate, 1,3-butanediol di(meth)acrylate, 1,6-hexanediol di(meth) acrylate, 1,9-nonanediol di(meth)acrylate, 1,10-decanediol di(meth)acrylate, 2-n-butyl-2-ethyl-1,3-propanediol di(meth)acrylate, dipropylene glycol di(meth)acrylate, tripropylene glycol di(meth)acrylate, polypropylene glycol di(meth) acrylate, ethylene glycol di(meth)acrylate, diethylene glycol di(meth)acrylate, tetraethylene glycol di(meth)acrylate, polyethylene glycol di(meth)acrylate, propylene-oxide-added bisphenol A di(meth)acrylate, ethylene-oxide-added bisphenol A di(meth)acrylate, ethylene-oxide-added bisphenol F di(meth)acrylate, dimethylol dicyclopentadiene di(meth)acrylate, 1,3-butylene glycol di(meth)acrylate, neopentyl glycol di(meth)acrylate, ethylene-oxide-modified isocyanuric acid di(meth)acrylate, 2-hydroxy-3-acryloyloxypropyl di(meth)acrylate, carbonate diol di(meth)acrylate, polyetherdiol di(meth)acrylate, polyesterdiol di(meth)acrylate, polycaprolactonediol di(meth)acrylate, and polybutadienediol di(meth)acrylate.

Among the ester compounds produced by the reaction of a compound having a hydroxyl group with a (meth)acrylic acid, any tri- or higher functional ester compound can be used; examples thereof include pentaerythritol tri(meth) acrylate, trimethylolpropane tri(meth)acrylate, propylene-oxide-added trimethylolpropane tri(meth)acrylate, ethylene-oxide-added trimethylolpropane tri(meth)acrylate, caprolactone-modified trimethylolpropane tri(meth)acrylate, ethylene-oxide-added isocyanuric acid tri(meth)acrylate, dipentaerythritol penta(meth)acrylate, dipentaerythritol hexa(meth)acrylate, ditrimethylolpropane tetra(meth)acrylate, pentaerythritol tetra(meth)acrylate, glycerine tri(meth)acrylate, propylene-oxide-added glycerine tri(meth)acrylate, and tris(meth)acryloyloxyethyl phosphate.

(2) Urethane(Meth)Acrylates Produced by Reaction of Acrylic Acid Derivative Having Hydroxyl Group with Isocyanate Any urethane(meth)acrylate produced by the reaction of a (meth)acrylic acid derivative having a hydroxyl group with isocyanate can be used; for instance, a urethane (meth) acrylate can be produced by the reaction of two equivalents of a (meth)acrylic acid derivative having a hydroxyl group with one equivalent of a compound having two isocyanate groups in the presence of a tin compound as a catalyst.

Any isocyanate can be used as a material of the urethane (meth)acrylate produced by the reaction of a (meth)acrylic acid derivative having a hydroxyl group with isocyanate; examples thereof include isophorone diisocyanate, 2,4-tolylene diisocyanate, 2,6-tolylene diisocyanate, hexamethylene diisocyanate, trimethylhexamethylene diisocyanate, diphenylmethane-4,4'-diisocyanate (MDI), hydrogenated MD), polymeric MDI, 1,5-naphthalene diisocyanate, norbornane diisocyanate, tolidine diisocyanate, xylylene diisocyanate (XDI), hydrogenated XDI, lysine diisocyanate, triphenylmethane triisocyanate, tris(isocyanatophenyl) thiophosphate, tetramethylxylene diisocyanate, and 1,6,10-undecane triisocyanate.

The isocyanate to be used as a material of the urethane (meth)acrylate produced by the reaction of a (meth)acrylic acid derivative having a hydroxyl group with isocyanate also can be, for instance, a chain-extended isocyanate compound which is obtainable by the reaction of an excess amount of an isocyanate with a polyol such as ethylene glycol, glycerine, sorbitol, trimethylolpropane, (poly)propylene glycol, carbonate diol, polyether diol, polyester diol, or polycaprolactone diol.

Any (meth)acrylic acid derivative having a hydroxyl group can be used; examples thereof include commercially available products such as 2-hydroxyethyl (meth)acrylate, 2-hydroxypropyl (meth)acrylate, 4-hydroxybutyl (meth)acrylate, and 2-hydroxybutyl (meth)acrylate; mono(meth)acrylates of dihydric alcohols such as ethylene glycol, propylene glycol, 1,3-propanediol, 1,3-butanediol, 1, 4-butanediol, and polyethylene glycol; mono(meth)acrylates or di(meth)acrylates of trihydric alcohols such as trimethylolethane, trimethylolpropane, and glycerine; and epoxy (meth)acrylates such as bisphenol A-modified epoxy (meth)acrylate.

In particular, for example, the urethane (meth)acrylate can be produced as follows: 0.2 parts by weight of BHT as a polymerization inhibitor, 0.01 part by weight of dibutyl tin dilaurate as a reaction catalyst, and 666 parts by weight of isophorone diisocyanate are added to 134 parts by weight of trimethylolpropane; the reaction is carried out for 2 hours under reflux with stirring at 60° C.; then 51 parts by weight of 2-hydroxyethyl acrylate is added thereto; and the reaction is performed for 2 hours under reflux with stirring at 90° C. while air is supplied.

Examples of commercially available products of the urethane (meth)acrylate include M-1100, M-1200, M-1210, and M-1600 (each manufactured by TOAGOSEI CO., LTD.); Ebecryl 230, Ebecryl 270, Ebecryl 4858, Ebecryl 8402, Ebecryl 8804, Ebecryl 8803, Ebecryl 8807, Ebecryl 9260, Ebecryl 1290, Ebecryl 5129, Ebecryl 4842, Ebecryl 210, Ebecryl 4827, Ebecryl 6700, Ebecryl 220, and Ebecryl 2220 (each manufactured by DAICEL-CYTEC Company, Ltd.); Art Resin UN-9000H, Art Resin UN-9000A, Art Resin UN-7100, Art Resin UN-1255, Art Resin UN-330, Art Resin UN-3320HB, Art Resin UN-1200TPK, and Art Resin SH-500B (each manufactured by Negami chemical industrial co., ltd.); U-122P, U-108A, U-340P, U-4HA, U-6HA, U-324A, U-15HA, UA-5201P, UA-W2A, U-1084A, U-6LPA, U-2HA, U-2PHA, UA-4100, UA-7100, UA-4200, UA-4400, UA-340P, U-3HA, UA-7200, U-2061BA, U-10H, U-122A, U-340A, U-108, U-6H, and UA-4000 (each manufactured by Shin Nakamura Chemical Co., Ltd.); and AH-600, AT-600, UA-306H, AI-600, UA-101T, UA-1011, UA-306T, and UA-3061.

The curable resin preferably has at least one hydrogen-bonding functional group per molecule in order to further reduce flowing of components of the sealant, which is used in a liquid-crystal-dropping technique according to the present invention, into liquid crystal in its uncured state.

The hydrogen-bonding functional group is not particularly limited; examples thereof include functional groups, such as a —OH group, a —SH group, a —NHR group (R represents an aromatics, aliphatic hydrocarbons, or derivatives thereof), a —COOH group, and a —NHOH group, and residues remaining in molecules, such as —NHCO—, —NH—, —CONHCO—, and —NH—NH—. Among these, a —OH group is preferred because it is easy to be introduced.

The sealant in the present invention may contain a resin having an epoxy group.

The resin having an epoxy group is not particularly limited; examples thereof include epichlorohydrin derivatives, alicyclic epoxy resins, and compounds produced by the reaction of isocyanate with glycidol.

Any resin having an epoxy group can be used, and examples thereof include bisphenol A epoxy resins, bisphenol F epoxy resins, bisphenol S epoxy resins, 2,2'-diallyl bisphenol A epoxy resins, hydrogenated bisphenol epoxy resins, propylene-oxide-added bisphenol A epoxy resins, resorcinol epoxy resins, biphenyl epoxy resins, sulfide epoxy resins, diphenyl ether epoxy resins, dicyclopentadiene epoxy resins, naphthalene epoxy resins, phenol novolac epoxy resins, o-cresol novolac epoxy resins, dicyclopentadiene novolac epoxy resins, biphenyl novolac epoxy resins, naphthalene phenol novolac epoxy resins, glycidylamine epoxy resins, alkyl polyol epoxy resins, rubber-modified epoxy resins, glycidyl ester compounds, and bisphenol A episulphide resins.

Examples of the epichlorohydrin derivatives include bisphenol A epoxy resins such as jER828EL and jER1004 (each manufactured by Mitsubishi Chemical Corporation) and EPICLON 850-S (manufactured by DIC Corporation); bisphenol F epoxy resins such as jER806 and jER4004 (each manufactured by Mitsubishi Chemical Corporation); bisphenol S epoxy resins such as EPICLON EXA1514 (manufactured by DIC Corporation); 2,2'-diallyl bisphenol A epoxy resins such as RE-810NM (manufactured by Nippon Kayaku Co., Ltd.); hydrogenated bisphenol epoxy resins such as EPICLON EXA7015 (manufactured by DIC Corporation); propylene-oxide-added bisphenol A epoxy resins such as EP-4000S (manufactured by ADEKA CORPORATION); resorcinol epoxy resins such as EX-201 (manufactured by Nagase ChemteX Corporation); biphenyl epoxy resins such as jERYX-4000H (manufactured by Mitsubishi Chemical Corporation); sulfide epoxy resins such as YSLV-50TE (manufactured by Nippon Steel Chemical Co., Ltd.); biphenyl ether epoxy resins such as YSLV-80DE (manufactured by Nippon Steel Chemical Co., Ltd.); dicyclopentadiene epoxy resins such as EP-4088S (manufactured by ADEKA CORPORATION); naphthalene epoxy resins such as EPICLON HP4032 and EPICLON EXA-4700 (each manufactured by DIC Corporation); phenol novolac epoxy resin such as EPICLON N-770 (manufactured by DIC Corporation); o-cresol novolac epoxy resins such as EPICLON N-670-EXP-S (manufactured by DIC Corporation); dicyclopentadiene novolac epoxy resins such as EPICLON HP7200 (manufactured by DIC Corporation); biphenyl novolac epoxy resins such as NC-3000P (manufactured by Nippon Kayaku Co., Ltd.); naphthalene phenol novolac epoxy resins such as ESN-165S (manufactured by Nippon Steel Chemical Co., Ltd.); glycidylamine epoxy resins such as jER630 (manufactured by Mitsubishi Chemical Corporation), EPICLON 430 (manufactured by DIC Corporation), TETRAD-X (manufactured by MITSUBISHI GAS CHEMICAL COMPANY, INC.); alkyl polyol epoxy resins such as ZX-1542 (manufactured by Nippon Steel Chemical Co., Ltd.), EPICLON 726 (manufactured by DIC Corporation), EPOLIGHT 80MFA (manufactured by kyoeisha Chemical Co., Ltd.), and DENACOL EX-611 (manufactured by Nagase ChemteX Corporation); rubber-modified epoxy resins such as YR-450 and YR-207 (each manufactured by Nippon Steel Chemical. Co., Ltd.) and Epolead PB (manufactured by Daicel Corporation); glycidyl ester compounds such as DENACOL EX-147 (manufactured by Nagase ChemteX Corporation); bisphenol A episulphide resins such as jERYL-7000 (manufactured by Mitsubishi Chemical Corporation); and YDC-1312, YSLV-80XY, and YSLV-90CR (each manufactured by Nippon Steel Chemical Co., Ltd.), XAC4151 (manufactured by Asahi Kasei Corp.), jER1031 and jER1032 (each manufactured by Mitsubishi Chemical Corporation), EXA-7120 (manufactured by DIC Corporation), and TEPIC (manufactured by Nissan Chemical Industries, Ltd.).

The above-mentioned alicyclic epoxy resins are not particularly limited; examples of commercially available products thereof include Celloxide 2021, Celloxide 2080, Celloxide 3000, Epolead GT300, and EHPE (each manufactured by Daicel Corporation).

Any compound produced by the reaction of isocyanate with glycidol can be used; for instance, such a compound can be produced by the reaction of a compound having two isocyanate groups with two equivalents of glycidol in the presence of a tin compound as a catalyst.

Any isocyanate can be used; examples thereof include isophorone diisocyanate, 2,4-tolylene diisocyanate, 2,6-tolylene diisocyanate, hexamethylene diisocyanate, trimethylhexamethylene di isocyanate, diphenylmethane-4,4'-diisocyanate (MDI), hydrogenated MDI, polymeric MDI, 1,5-naphthalene diisocyanate, norbornane diisocyanate, tolidine diisocyanate, xylylene diiocyanate (XDI), hydrogenated XDI, lysine diisocyanate, triphenylmethane triisocyanate, tris(isocyanatophenyl) thiophosphate, tetramethylxylene diisocyanate, and 1,6,10-undecane triisocyanate.

The isocyanate also can be, for instance, a chain-extended isocyanate compound which is obtainable by the reaction of an excess amount of an isocyanate with a polyol such as ethylene glycol, glycerine, sorbitol, trimethylolpropane, (poly)propylene glycol, carbonate diol, polyether diol, polyester diol, or polycaprolactone diol.

The resin having an epoxy group may be, for example, a resin having a (meth)acryloyloxy group and an epoxy group per molecule. An example of such a compound is a partially (meth)acrylic-modified epoxy resin produced by the reaction of some epoxy groups of a compound having two or more epoxy groups with a (meth)acrylic acid.

The curable resin may consist of only the resin having a (meth)acryloyloxy group and an epoxy group per molecule.

The partially (meth)acrylic-modified epoxy resin can be, for example, produced by the reaction of (meth)acrylic acid with an epoxy resin in the presence of a basic catalyst in accordance with routine procedures. In particular, for instance, 190 g of phenol novolac epoxy resin ("N-770" manufactured by DIC Corporation) is dissolved in 500 mL of toluene, 0.1 g of triphenylphosphine is added to the solution to make the solution homogeneous, 35 g of acrylic acid is dropped into the resulting solution for 2 hours under reflux with stirring, the ref lux with stirring is further continued for 6 hours, and then toluene is removed to produce a partially acrylic-modified phenol novolac epoxy resin in which 50 mol % of epoxy groups have reacted with an acrylic acid (50% acrylated in this case).

An example of commercially available products of the partially (meth)acrylic-modified epoxy resin is UVA-CURE1561 (manufactured by DAICEL-CYTEC Company, Ltd.).

The curable resin composition containing the compound having at least one (meth)acrylic group and at least one epoxy group per molecule preferably contains a curing agent. In particular, it is preferred that a photopolymerization initiator be used. Any photopolymerization initiator can be employed; a radical photopolymerization initiator is preferred, and an alkylphenone photopolymerization initiator, an oxime ester photopolymerization initiator, and an acylphosphine oxide photopolymerization initiator are especially preferred.

Examples of the photopolymerization initiator include benzophenone, 2,2-diethoxyacetophenone, 2,2-dimethoxy-1,2-diphenylethane-1-one, 1-[4-(2-hydroxyethoxy)-phenyl]-2-hydroxy-2-methyl-1-propane-1-one, benzoyl isopropyl ether, benzyl dimethyl ketal, 1-hydroxycyclohexyl phenyl ketone, thioxanthone, and 1,2-octanedione 1-[4-(phenylthio)-2-(O-benzoyloxime)]. These photopolymerization initiators can be used alone or in combination.

A photopolymerization initiator having a reactive double bond and a photoreaction initiating part may be used. In particular, benzoin(ether) compounds having a reactive double bond and a hydroxyl group and/or a urethane bond are preferred. The benzoin(ether) compounds refer to benzoins and benzoin ethers.

Examples of the reactive double bond include residues such as an allyl group, a vinyl ether group, and a (meth)acrylic group; in application to a photopolymerization initiator used in a sealant, a (meth)acrylic residue is preferred because it is highly reactive. Such a reactive double bond contributes to an enhancement in weather resistance.

The benzoin(ether) compounds may have any one of a hydroxyl group and a urethane bond or both of them. In the case where a benzoin(ether) compound having no hydroxyl group and no urethane bond is used, the benzoin(ether) compound added to the sealant may flow into liquid crystal before curing.

In the benzoin(ether) compounds, the reactive double bond and a hydroxyl group and/or a urethane bond may be at any position on the benzoin(ether) skeleton; a benzoin (ether) compound having a molecular framework represented by General Formula (1-A) is preferred. Use of a compound having such a molecular framework as a photopolymerization initiator enables a reduction in a remaining substance, which leads to a decrease in the amount of outgas.

[Chem. 18]

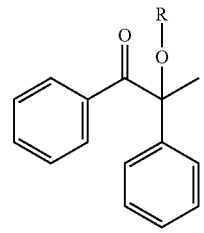

(1-A)

In the formula, R represents a hydrogen atom or an aliphatic hydrocarbon residue having four or less carbon atoms. In the case where R is an aliphatic hydrocarbon residue having carbon atoms of greater than four, use of the photopolymerization initiator contributes to an enhancement in storage stability but may reduce reactivity owing to the steric hindrance of substituents.

The amount of the photopolymerization initiator is preferably in the range of 0.1 to 10 parts by weight relative to 100 parts by weight of the curable resin. At an amount of less than 0.1 part by weight, the function of initiating photopolymerization is insufficient with the result that a good effect is not produced in some cases; at an amount of greater than 10 parts by weight, many unreacted parts of the photopolymerization initiator may remain with the result that weather resistance is impaired in some cases. The amount is more preferably from 1 to 5 parts by weight.

The curable resin composition containing the compound having at least one (meth)acrylic group and at least one epoxy group per molecule preferably contains a thermosetting agent as well. The thermosetting agent promotes the reaction and crosslinking of the epoxy group and/or acrylic group in the curable resin composition by heating and serves to enhance the adhesion and moisture resistance of the curable resin composition after curing. Any thermosetting agent can be used, and a latent thermosetting agent having a melting point of 100° C. or higher is preferably employed. Use of a thermosetting agent having a melting point of not more than 100° C. may significantly degrade storage stability.

Examples of such a thermosetting agent include hydrazide compounds such as 1,3-bis[hydrazinocarbonoethyl-5-isopropylhydantoin]; dicyandiamide; guanidine derivatives; imidazol derivatives such as 1-cyanoethyl-2-phenylimidazole, N-[2-(2-methyl-1-imidazolyl)ethyl]urea, 2,4-diamino-6-(2'-methylimidazolyl-(1')-ethyl-s-triazine, N,N'-bis(2-methyl-1-imidazolylethyl)urea, N,N'-(2-methyl-1-imidazolylethyl)-adipoamide, 2-phenyl-4-methyl-5-hydroxymethylimidazole, and 2-phenyl-4,5-dihydroxymethylimidazole; modified aliphatic polyamines; acid anhydrides such as tetrahydrophthalic anhydride and ethylene glycol-bis(anhydrotrimellitate); and addition products of various amines and epoxy resins. These materials may be used alone or in combination.

In the case where an acrylic acid-modified epoxy resin is used as the compound having at least one (meth)acrylic group and at least one epoxy group per molecule, the reactivity of the acrylic epoxy resin greatly varies on the basis of its structure; in the case where a urethane-modified epoxy resin is used, its stability gives excellent storage stability even when a highly reactive thermosetting agent is used. In the case where a (meth)acrylic acid-modified epoxy resin is employed, a thermosetting agent having a melting point of not less than 100° C. and small reactivity is preferred in terms of storage stability because the (meth)acrylic acid-modified epoxy resin is highly reactive.

The amount of the thermosetting agent is preferably in the range of 5 to 60 parts by weight, and more preferably 10 to 50 parts by weight relative to 100 parts by weight of the curable compound. At an amount out of such a range, the adhesiveness and chemical resistance of the cured product may be reduced, which results in promoting degradation of the properties of liquid crystal in an operation test under a high-temperature and high-humidity environment in some cases.

The thermosetting agent is preferably a coated thermosetting agent which will be described later. Using the coated thermosetting agent in the present invention gives a sealant significantly high storage stability even when the sealant is one-package type.

In particular, a coated thermosetting agent in which the surface of a solid thermosetting agent is coated with fine particles that are less volatile and less soluble in organic materials is used, thereby being able to produce a sealant which has a high storage stability even though the curing agent has been preliminarily added to the sealant.

The term "solid thermosetting agent" herein refers to a curing agent which is in the form of a solid at room temperature and which is melted or softened by heating to start to react with a curable resin. Any solid thermosetting agent can be used provided that its melting point, or softening point is greater than or equal to room temperature; examples of such a solid thermosetting agent include solid amine compounds, phenolic compounds, and acid anhydrides. Among these, solid amine compounds are preferred because they are highly reactive at low temperature.

The term "solid amine compounds" refers to solid compounds each having one or more primary to tertiary amino groups per molecule. Examples thereof include aromatic amines such as methaphenylene diamine and diaminodiphenyl methane; imidazole compounds such as 2-methylimidazole, 1,2-dimethylimidazole, and 1-cyanoethyl-2-methylimidazole; imidazoline compounds such as 2-methylimidazoline; and dihydrazide compounds such as sebacic acid dihydrazide and isophthalic acid dihydrazide. Examples of commercially available products of the solid amine compounds include amine adducts, such as Amicure PN-23 and Amicure MY-24 (each manufacture by Ajinomoto Fine-Techno Co., Inc.), and dicyandiamide.

Examples of the polyhydric phenolic compounds include polyphenolic compounds and novolac phenolic resins. Examples of commercially available products of the polyhydric phenolic compounds include jERCURE 170, jERCURE YL6065, and jERCURE MP402FPI (each manufactured by Mitsubishi Chemical Corporation).

Examples of the acid anhydride include glycerine bis (anhydrotrimellitate), ethylene glycol-bis(anhydrotrimellitate), tetrahydrophthalic anhydride, hexahydrophthalic anhydride, 4-methylhexahydrophthalic anhydride, and 3-methyltetrahydrophthalic anhydride. Examples of commercially available products of these acid anhydrides include jERCURE YH-306 and YH-307 (each manufactured by Mitsubishi Chemical Corporation).

The particles of the solid thermosetting agent may have any average particle size; the average particle size is preferably in the range of 0.1 to 50 µm. At an average particle size of less than 0.1 µm, the surface cannot be efficiently coated with the fine particles in some cases; at an average particle size of greater than 50 µm, the curing agent added to the sealant may be precipitated during storage thereof or may cause uneven curing. The average particle size is more preferably from 0.5 to 10 µm.

The fine particles which coat the surfaces of the particles of the solid thermosetting agent can be oxides, hydroxides, and halides of Si, Al, Ti, Fe, Mn, and Mg; styrene beads; or particulate rubber. These types of fine particles may be used alone or in combination.

The average particle size of the fine particles is preferably not more than 0.05 µm. At an average particle size of greater than 0.05 µm, the surfaces of the particles of the solid thermosetting agent cannot be efficiently coated in some cases. The average particle size is more preferably not more than 0.03 µm. It is preferred that the particle size of the fine particles be not more than 10% of that of the particles of the solid thermosetting agent. In the case where it is 10% or more, the function of controlling the reactivity is insufficient in some cases.

The weight ratio of the particles of the solid thermosetting agent to the fine particles in the coated thermosetting agent is preferably from 50:1 to 3:1. In the case where the weight ratio of the particles of the solid thermosetting agent is greater than 50, the function of controlling the reactivity is insufficient in some cases; in the case where it is less than 3, fine particles are excessive, which results in impairing the curing function in some cases. The weight ratio is more preferably from 20:1 to 5:1.

The surfaces of the particles of the solid thermosetting agent can be coated with the fine particles by any technique; for example, a technique in which the particles of the solid thermosetting agent are mixed with fine particles with a commercially available blender in a container to make the mixture homogeneous can be used.

The amount of the coated thermosetting agent in the curable resin composition is preferably in the range of 1 to 100 parts by weight relative to 100 parts by weight of the curable resin composition. If the amount is less than 1 part by weight, the curing may become insufficient; if the amount is greater than 100 parts by weight, an excess amount of the thermosetting agent remains, which results in impairing the physical properties of a cured product to be obtained, such as toughness, in some cases.

The coated thermosetting agent added to the curable resin composition has a high storage stability in storage at normal temperature because the contact of the solid thermosetting agent with the polymerizable resin is reduced as much as possible owing to the fine particles which are present on the surface thereof; in a curing process, the solid thermosetting agent becomes liquid by application of heat and is therefore brought into contact with the curable resin without being inhibited by the fine particles, so that the curing reaction immediately begins. Accordingly, the storage stability of the curable resin composition is improved. The coated thermosetting agent can be very simply produced at a normal temperature in a short time without requiring a specific reaction.

The curable resin composition containing the compound having at least one (meth)acrylic group and at least one epoxy group per molecule may contain a radical polymerization inhibitor.

Examples of the radical polymerization inhibitor include 2,6-di-t-butyl cresol, butylated hydroxyanisole, 2,6-di-t-butyl-4-ethylphenol, stearyl β-(3,5-di-t-butyl-4-hydroxyphenyl)propionate, 2,2'-methylene bis(4-methyl-6-t-butylphenol), 2,2'-methylene bis(4-ethyl-6-t-butylphenol), 4,4'-thiobis-3-methyl-6-t-butylphenol), 4,4-butylidene bis(3-methyl-6-t-butylphenol), 3,9-bis[1,1-dimethyl-2-[β-(3-t-butyl-4-hydroxy-5-methyl phenyl)propionyloxy]ethyl], 2,4, 8,10-tetraoxaspiro[5,5]undecane, tetrakis-[methylene-3-(3', 5'-di-t-butyl-4'-hydroxyphenyl)propionate]methane, 1,3,5-tris(3',5'-di-t-butyl-4'-hydroxybenzyl)-sec-triazine-2,4,6-(1H,3H,5H)trione, hydroquinone, and paramethoxyphenol. These radical polymerization inhibitors may be used alone or in combination.

The lower limit and upper limit of the amount of the radical polymerization inhibitor are 0.1 part by weight and 0.4 parts by weight relative to 100 parts by weight of the curable resin composition, respectively. In the case where the amount of the radical polymerization inhibitor is less than 0.1 part by weight, the radical polymerization inhibitor is quickly consumed by the small amount of radicals which are generated when slight light is present in production of liquid crystal display devices; hence, the sealant is unintentionally cured when it is exposed to slight light which is not for curing the sealant. In the case where the amount of the radical polymerization inhibitor is greater than 0.4 parts by weight, a sealant to be produced is significantly less curable when it is irradiated with ultraviolet; hence, the sealant is not cured in some cases even though it is irradiated with ultraviolet for the purpose of being cured.

The curable resin composition containing the compound having at least one (meth)acrylic group and at least one epoxy group per molecule preferably further contains a silane coupling agent. The silane coupling agent primarily serves as an adhesion aid for well attaching the sealant and the substrates of the liquid crystal display device to each other. In addition, in the case where an inorganic or organic filler is used to improve the adhesiveness by the effect of stress dispersion and the coefficient of linear expansion, the silane coupling agent may be used in a process in which the surface of the filler is treated with the silane coupling agent to enhance the interaction of the resin contained in the sealant with the filler.

The silane coupling agent is preferably a silane compound having at least one functional group selected from the group (2-A) and at least one functional group selected from the group (2-B).

[Chem. 19]

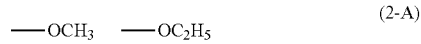

[Chem. 20]

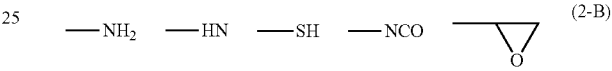

Specific examples of such a silane compound include γ-aminopropyltrimethoxysilane, γ-mercaptopropyltrimethoxysilane, γ-glycidoxypropyltrimethoxysilane, and γ-isocyanatepropyltrimethoxysilane. These silane compounds can be used alone or in combination.

Using the silane compound having such a structure as a silane coupling agent enables an enhancement in adhesiveness to substrates and also eliminates flowing of components of the curable resin into liquid crystal owing to a chemical bond of the silane compound to the curable resin via a functional group selected from the group (2-B).

The silane compound is mixed with components of the curable resin and then subjected to a thermal treatment. The thermal treatment causes the silane compound to be chemically bonded to the components of the curable resin via the functional group selected from the group 2-B. The thermal treatment is preferably performed under stirring of the resin mixture in order to enhance the reaction efficiency. The stirring is carried out in any way; for example, a general technique, such as rotating a stirrer or stirring blades by means of a motor, can be used. The temperature in the thermal treatment is preferably in the range of 30 to 70° C. At a temperature lower than 30° C., the reaction of the silane compound with the curable resin is insufficient in some cases; at a temperature higher than 70° C., curing may begin owing to the heat. The temperature is more preferably from 40 to 60° C. The duration of the thermal treatment is preferably from one to two hours. In the case where the duration is shorter than one hour, every functional group of the silane compound does not react, and thus unreacted substances may remain in some cases.

The residual rate of at least one functional group selected from the group (2-B) after the thermal treatment is not more than 10%. At a residual rate of greater than 10%, the functional group reacts with components of the resin during storage, which results in an increase in the viscosity and pollution of liquid crystal due to flowing of components into the liquid crystal. The residual rate of at least one functional group selected from the group 2-B can be calculated by a 1H-NMR analysis from the relative ratio between the intensity of the peaks of the functional groups in the silane compound and the intensity thereof after the thermal treatment.

The curable resin composition containing the compound having at least one (meth)acrylic group and at least one epoxy group per molecule may contain a filler as well in order to control viscosity and to improve the adhesiveness by the effect of stress dispersion.

Any filler can be used; examples of usable fillers include inorganic fillers such as talc, asbestos, silica, diatomaceous earth, smectite, bentonite, calcium carbonate, magnesium carbonate, alumina, montmorillonite, diatomaceous earth, zinc oxide, iron oxide, magnesium oxide, tin oxide, titanium oxide, magnesium hydroxide, aluminum hydroxide, glass beads, silicon nitride, barium sulfate, gypsum, calcium silicate, sericite-activated clay, and aluminum nitride and organic fillers such as polyester microparticles, polyurethane microparticles, vinyl polymer microparticles, acrylic polymer microparticles, and rubber microparticles. The filler may have any shape; it may have a regular shape such as a spherical shape, an acicular shape, or a planar shape or may be amorphous.

The curable resin composition containing the compound having at least one (meth)acrylic group and at least one epoxy group per molecule may contain fine resin particles as well.

The fine resin particles consist of core particles formed of a resin having a rubber elasticity and a glass transition temperature of not more than −10° C. and shell layers formed of a resin having a glass transition temperature from 50 to 150° C. on the surfaces of the core particles.

The glass transition temperature is herein measured by a general DSC technique at a temperature increase rate of 10° C./min unless otherwise specified.

The resin having a rubber elasticity and a glass transition temperature of not more than −10° C. is not particularly limited; a polymer of a (meth)acrylic monomer is preferred.

Examples of the (meth)acrylic monomer include ethyl acrylate, propyl acrylate, n-butyl acrylate, cyclohexyl acrylate, 2-ethylhexyl acrylate, ethyl methacrylate, and butyl methacrylate. These (meth)acrylic monomers can be used alone for polymerization or in combination for copolymerization.

The resin having a glass transition temperature from 50 to 150° C. is not particularly limited. Examples thereof include polymers produced through polymerization of isopropyl methacrylate, t-butyl methacrylate, cyclohexyl methacrylate, phenyl methacrylate, methyl methacrylate, styrene, 4-chlorostyrene, 2-ethylstyrene, acrylonitrile, or vinyl chloride. These monomers may be used alone or in combination.

The particle size of the fine resin particles is appropriately determined on the basis of the intended purpose; the preferred lower limit and upper limit thereof are 0.01 μm and 5 μm, respectively. Within this range, the fine resin particles have an enough surface area relative to the photocurable resin, which effectively gives the swelling effect of the core layer; in addition, such a particle size can give workability for forming a gap between substrates when the fine resin particles are used in a sealant for liquid crystal display devices.

A technique for producing fine resin particles is not particularly limited; for example, only the monomer that serves as the core is used to form core particles through emulsion polymerization, and then another monomer that serves as a shell is added thereto and polymerized in order to form a shell layer on the surface of each core particle.

The preferred lower limit and upper limit of the amount of the fine resin particles in the curable resin composition are 15 parts by weight and 50 parts by weight relative to 100 parts by weight of the photocurable resin, respectively. At an amount of less than 15 parts by weight, an enhancement in adhesiveness may be insufficient; at an amount of greater than 50 parts by weight, the viscosity may be unnecessarily increased. The more preferred upper limit is 20 parts by weight.

(Alignment Film)

In the liquid crystal display device of the present invention, in the case where alignment films need to be provided on the liquid crystal composition sides of the first and second substrates to align the molecules of the liquid crystal composition, the alignment films are disposed between a color filter and the liquid crystal layer in the liquid crystal display device. Each alignment film, however, has a thickness of not more than 100 nm even when the thickness is large; hence, the alignment films do not completely block the interaction between a colorant used in the color filter, such as a pigment, and a liquid crystal compound used in the liquid crystal layer.

In a liquid crystal display device in which an alignment film is not used, the interaction between a colorant used in the color filter, such as a pigment, and a liquid crystal compound used in the liquid crystal layer is larger.

The material of the alignment films can be a transparent organic material such as polyimide, polyamide, BCB (benzocyclobutene polymer), or polyvinyl alcohol; in particular, polyimide alignment films formed though imidizing of a polyamic acid synthesized from diamine such as an aliphatic or alicyclic diamine (e.g., p-phenylenediamine and 4,4'-diaminodiphenyl methane), an aliphatic or alicyclic tetracarboxylic acid anhydride such as butanetetracarboxylic acid anhydride or 2,3,5-tricarboxycyclopentyl acetic acid anhydride, and an aromatic tetracarboxylic acid anhydride such as pyromellitic acid dianhydride are preferred. In this case, rubbing is generally carried out to give an alignment function; however, in the case where each alignment film is used as, for instance, a vertical alignment film, the alignment film can be used without the alignment function being developed.

Materials usable for the alignment films may be materials in which compounds contain, for instance, chalcone, cinnamate, cinnamoyl, or an azo group. Such materials may be used in combination with another material such as polyimide or polyamide; in this case, the alignment films may be rubbed or treated by a photo-alignment technique.

In general formation of alignment films, the above-mentioned material of the alignment films is applied onto substrates by, for example, spin coating to form resin films; besides, uniaxial stretching or a Langmuir-Blodgett technique can be employed.

(Transparent Electrode)

In the liquid crystal display device of the present invention, the material of a transparent electrode can be a conductive metal oxide. Usable metal oxides are indium oxide ($In_2O_3$), tin oxide (SnO), zinc oxide (ZnO), indium tin oxide ($In_2O_3$—$SnO_2$), indium zinc oxide ($In_2O_3$—ZnO), niobium-doped titanium dioxide ($Ti_{1-x}Nb_xO_2$), fluorine-doped tin oxide, graphene nanoribbon, and metal nanowires; among these, zinc oxide (ZnO), indium tin oxide ($In_2O_3$—$SnO_2$), and indium zinc oxide ($In_2O_3$—ZnO) are preferred. A transparent conductive film formed of any of such materials can be patterned by photo-etching or a technique involving use of a mask.

The liquid crystal display device of the present invention is particularly useful for active-matrix liquid crystal display devices and can be applied to liquid crystal display devices of a TN mode, IPS mode, polymer-stabilized IPS mode, FFS mode, OCB mode, VA mode, and ECB mode.

The liquid crystal display device is combined with a backlight for various applications such as liquid crystal television sets, computer monitors, mobile phones, smartphone displays, laptops, portable information terminals, and digital signage. Examples of the back light include cold-cathode tube backlights and virtually white backlights with two peak wavelengths or backlights with three peak wavelengths; in the backlight with two or three peak wavelengths, light-emitting diodes using inorganic materials or organic EL devices are used.

EXAMPLES

Although the present invention will now be described further in detail with reference to Examples, the present invention is not limited to Examples. In compositions which will be described in Examples and Comparative Examples, the term "%" refers to "mass %".

In Examples, the following properties were measured.

$T_{ni}$: Nematic phase-isotropic liquid phase transition temperature (° C.)

Δn: Refractive index anisotropy at 25° C.

Δ∈: Dielectric anisotropy at 25° C.

η: Viscosity at 20° C. (mPa·s)

γ1: Rotational viscosity at 25° C. (mPa·s)

VHR: Voltage holding ratio (%) at 70° C.

(ratio, represented by %, of a measured voltage to the initially applied voltage, which was obtained as follows: a liquid crystal composition was put into a cell having a thickness of 3.5 μm, and the measurement was carried out under the conditions of an applied voltage of 5 V, a frame time of 200 ms, and a pulse width of 64 μs)

ID: Ion density at 70° C. (pC/cm$^2$)

(ion density obtained as follows: a liquid crystal composition was put into a cell having a thickness of 3.5 μm, and measurement was carried out with an MTR-1 (manufactured by TOYO Corporation) under the conditions of an applied voltage of 20 V and a frequency of 0.05 Hz)

Uneven Alignment:

The degree of uneven alignment caused at the position at which a sealant was in contact with liquid crystal was visually observed in states in which electricity was applied and in which electricity was not applied, and the result of the observation was evaluated on the basis of the following four criteria.

Excellent: No uneven alignment observed
Good: Slight uneven alignment observed, but acceptable
Bad: Uneven alignment observed, unacceptable
Poor: Uneven alignment observed, quite inadequate Screen burn-in:

In evaluation of screen burn-in in a liquid crystal display device, a certain fixed pattern was displayed in a display area for 1000 hours, and then an image was shown evenly on the whole of the screen. Then, the degree of an afterimage of the fixed pattern was visually observed, and result of the observation was evaluated on the basis of the following four criteria:

Excellent: No afterimage observed
Good: Slight afterimage observed, but acceptable
Bad: Afterimage observed, unacceptable
Poor: Afterimage observed, quite inadequate Volume Resistivity of Sealant after Curing:

A sealant was evenly applied onto the chromium-deposited surface of a chromium-deposited glass substrate in the form of a thin film and then cured by being exposed to ultraviolet into an ultraviolet-cured product having a size of 85 mm×85 mm and a thickness of 3 m. Another chromium-deposited glass substrate was disposed on the ultraviolet-cured product such that its chromium-deposited surface faced the ultraviolet-cured product, and this product was compressed for an hour by applying a load thereto under being heated on a hot plate at 120° C., thereby producing a test sample. The area (S (cm$^2$)) of the sealant in the test sample was measured; in addition, a constant voltage (V (V)) was applied between the chromium-deposited surfaces of the facing chromium-deposited glass substrates with a constant voltage generator (PA36-2A regulated DC power supply manufactured by KENWOOD CORPORATION), and an electric current (A (A)) flowing in the film was measured with an ammeter (R644C digital multi-meter manufactured by ADVANTEST CORPORATION). Assuming that the thickness of the sealant was (T (cm)), volume resistivity (Ω·cm) was obtained from the following formula: volume resistivity (Ω·cm)=(V·S)/(A·T). In this case, the applied voltage was a direct current of 500 V, and the duration of the application was 1 minute.

Specific Resistance of Sealant before Curing:

The specific resistance of a sealant before curing was measured under standard temperature and humidity (20° C., 65% RH) with a specific resistance meter (Type SR-6517 manufactured by TOYO Corporation) and an electrode for liquid (Type LE-21 manufactured by Ando Electric Co., Ltd.).

In Examples, compounds are abbreviated as follows.

(Ring Structure)

[Chem. 21]

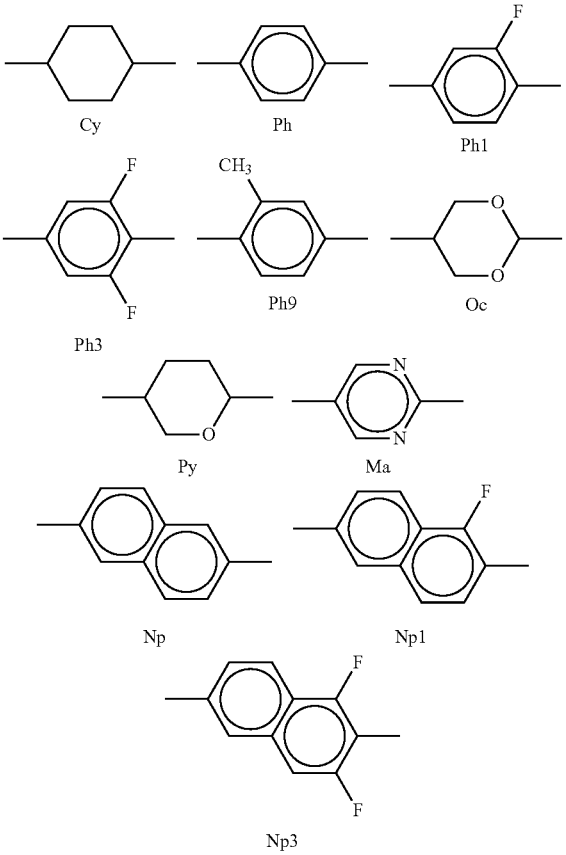

(Structure of Side Chain and Linking Structure)

TABLE 1

| n (number) at terminal | $C_nH_{2n+1}$— |
|---|---|
| -2- | —$CH_2CH_2$— |
| -1O- | —$CH_2O$— |
| -O1- | —$OCH_2$— |
| -V- | —CO— |
| -VO- | —COO— |
| -CFFO- | —$CF_2O$— |
| -F | —F |
| -Cl | —Cl |
| -CN | —C≡N |
| -OCFFF | —$OCF_3$ |
| -CFFF | —$CF_3$ |
| -On | —$OC_nH_{2n+1}$— |
| -T- | —C≡C— |
| -N- | —CH=N—N=CH— |
| ndm- | $C_nH_{2n+1}$—HC=CH—$(CH_2)_{m-1}$— |
| -ndm | —$(CH_2)_{n-1}$—HC=CH—$C_mH_{2m+1}$ |
| ndmO- | $C_nH_{2n+1}$—HC=CH—$(CH_2)_{m-1}$O— |
| -Ondm | —O—$(CH_2)_{n-1}$—HC=CH—$C_mH_{2m+1}$ |
| -ndm- | —$(CH_2)_{n-1}$—HC=CH—$(CH_2)_{m-1}$— |

Production of Curable Resin Composition (Synthesis Example A) Synthesis of Acrylic Acid-Modified Resorcinol Epoxy Resin (A)

In a solvent, 106 parts by weight of a resorcinol epoxy resin (EX-201 manufactured by Nagase ChemteX Corporation) and 0.1 parts by weight of triphenylphosphine were evenly dissolved. Then, 32 parts by weight of acrylic acid was dropped thereto for 2 hours under reflux with stirring, and the reflux with stirring was subsequently further carried out for 8 hours. Then, 100 parts by weight of the obtained resin was filtered through a column filled with 30 parts by weight of a nature-originated bound substance of quartz and kaolin (Sillitin V85 manufactured by HOFFMANN MINERAL GmbH) to adsorb ionic impurities in the reactant, and toluene was removed, thereby producing a 50% acrylic acid-modified resorcinol epoxy resin (A).

(Synthesis Example B) Synthesis of Acrylic Acid-Modified Bisphenol a Epoxy Resin (B)

In a solvent, 1280 parts by weight of a solid bisphenol A diglycidyl ether (EXA850CRP manufactured by DIC Corporation), 2 parts by weight of p-methoxyphenol as a polymerization inhibitor, and 2 parts by weight of triethylamine as a reaction catalyst were evenly dissolved. Then, 270 parts by weight of acrylic acid was dropped thereto for 2 hours under reflux with stirring, and the reflux with stirring was subsequently further carried out at 110° C. under supplying of air to promote the reaction for 5 hours. Then, 100 parts by weight of the obtained resin was filtered through a column filled with 30 parts by weight of a nature-originated bound substance of quartz and kaolin ("Sillitin V85" manufactured by HOFFMANN MINERAL GmbH) to adsorb ionic impurities in the reactant, and toluene was removed, thereby producing a 50% acrylic acid-modified bisphenol A epoxy resin (B).

(Synthesis Example C) Synthesis of Acrylic Acid-Modified Diphenyl Ether Epoxy Resin (C)

Under supplying of air, 1000 parts by weight of a diphenyl ether epoxy resin (YSLV-80DE manufactured by Nippon Steel Chemical Co., Ltd.), 2 parts by weight of p-methoxyphenol as a polymerization inhibitor, 2 parts by weight of triethylamine as a reaction catalyst, and 234 parts by weight of acrylic acid were subjected to reflux with stirring at 90° C. to promote a reaction for 6 hours. Then, 100 parts by weight of the obtained resin was filtered through a column filled with 30 parts by weight of a nature-originated bound substance of quartz and kaolin ("Sillitin V85" manufactured by HOFFMANN MINERAL GmbH) to adsorb ionic impurities in the reactant, and toluene was removed, thereby producing a 50% acrylic acid-modified diphenyl ether epoxy resin (C).

(Synthesis Example D) Synthesis of Methacrylic Acid-Modified Bisphenol E Epoxy Resin (D)

In a solvent, 1.63 parts by weight of bisphenol E epoxy resin R-1710 (manufactured by Printec Corporation) was dissolved. Then, 0.5 parts by weight of p-methoxyphenol as a polymerization inhibitor, 0.5 parts by weight of triethylamine as a reaction catalyst, and 40 parts by weight of methacrylic acid were added to the solution, and the resulting solution was subjected to reflux with stirring at 90° C. for 5 hours under supplying of air to promote a reaction. Then, 100 parts by weight of the obtained resin was filtered through a column filled with 30 parts by weight of a nature-originated bound substance of quartz and kaolin ("Sillitin V85" manufactured by HOFFMANN MINERAL GmbH) to adsorb ionic impurities in the reactant, and toluene was removed, thereby producing a 50% methacrylic acid-modified bisphenol E epoxy resin (curable resin D).

(Synthesis Example E) Synthesis of Acrylic Acid-Modified Phenol Novolac Epoxy Resin (E)

Under supplying of air, 1100 parts by weight of a liquid phenol novolac epoxy resin (D.E.N. 431 manufactured by The Dow Chemical Company), 2.2 parts by weight of p-methoxyphenol as a polymerization inhibitor, 2.2 parts by weight of triethylamine as a reaction catalyst, and 220 parts by weight of acrylic acid were subjected to reflux with stirring at 90° C. to promote a reaction for 5 hours. Then, 100 parts by weight of the obtained resin was filtered through a column filled with 30 parts by weight of a nature-originated bound substance of quartz and kaolin (Sillitin V85 manufactured by HOFFMANN MINERAL GmbH) to adsorb ionic impurities in the reactant, and toluene was removed, thereby producing an acrylic acid-modified phenol novolac epoxy resin (E) (50% partially acrylated product).

(Synthesis Example F) Synthesis of Urethane-Modified Acrylic Epoxy Resin (F)

To 1100 parts by weight of trimethylolpropane, 1.6 parts by weight of 3,5-dibutyl-4-hydroxytoluene as a polymerization inhibitor, 0.08 parts by weight of dibutyl tin dilaurate as a reaction catalyst, and 5400 parts by weight of isophorone diisocyanate were added, and a reaction was performed for 2 hours under reflux with stirring at 60° C. Then, 210 parts by weight of 2-hydroxyethyl acrylate and 910 parts by weight of glycidol were added thereto, and the reaction was performed for 2 hours under reflux with stirring at 90'C while air was supplied. Then, 1.00 parts by weight of the obtained resin was filtered through a column filled with 30 parts by weight of a nature-originated bound substance of quartz and kaolin (Sillitin V85 manufactured by HOFFMANN MINERAL GmbH) to adsorb ionic impurities in the reactant, and toluene was removed, thereby producing a urethane-modified acrylic epoxy resin (F).

(Synthesis Example G) Synthesis of Urethane-Modified Methacrylic Epoxy Resin (G)

To 1100 parts by weight of trimethylolpropane, 1.6 parts by weight of 3,5-dibutyl-4-hydroxytoluene as a polymerization inhibitor, 0.08 parts by weight of dibutyl tin dilaurate as a reaction catalyst, and 6080 parts by weight of diphenylmethane diisocyanate were added, and a reaction was performed for 2 hours under reflux with stirring at 60° C. Then, 235 parts by weight of 2-hydroxyethyl methacrylate and 910 parts by weight of glycidol were added thereto, and the reaction was performed for 2 hours under reflux with stirring at 90° C. while air was supplied. Then, 100 parts by weight of the obtained resin was filtered through a column filled with 30 parts by weight of a nature-originated bound substance of quartz and kaolin (Sillitin V85 manufactured by HOFFMANN MINERAL GmbH) to adsorb ionic impurities in the reactant, and toluene was removed, thereby producing a urethane-modified methacrylic epoxy resin (G).

[Production of Sealant]

Sealant (1)

With a planetary stirring machine, 85 parts by weight of the acrylic acid-modified resorcinol epoxy resin (A), 18 parts by weight of the acrylic acid-modified bisphenol A epoxy resin (B), 33 parts by weight of the acrylic acid-modified diphenyl ether epoxy resin (C), 10 parts by weight of 2,2-dimethoxy-1,2-diphenylethane-1-one as a photoradical polymerization initiator, 38 parts by weight of a hydrazido curing agent as a latent thermosetting agent (Amicure VDH manufactured by Ajinomoto Fine-Techno Co., Inc.), 6 parts by weight of γ-glycidoxypropyltrimethoxysilane, 30 parts by weight of spherical silica (SO-C1 manufactured by Admatechs Company Limited), and 20 parts by weight of fine particles having a core-shell structure (F-351 manufactured by Zeon Corporation) were mixed with each other by stirring into an homogeneous liquid. The mixture was further subjected to mixing in a ceramic three-roll mill and then subjected to defoaming and mixing by stirring with a planetary stirring machine, thereby producing a sealant (1). The sealant (1) had the following properties.

Hydrogen-bonding Functional Group Value: $4.8 \times 10^{-3}$
Specific Resistance of Sealant before Curing (Ω·cm): $7.2 \times 10^{9}$
Volume Resistivity of Sealant after Curing (Ω·cm): $2.6 \times 10^{13}$ Sealant (2)

With a planetary stirring machine, 100 parts by weight of a phenol novolac epoxy resin ("N-740" manufactured by DIC Corporation), 60 parts by weight of the methacrylic acid-modified bisphenol E epoxy resin (D), 3 parts by weight of 1-[4-(2-hydroxyethoxy)-phenyl]-2-hydroxy-2-methyl-1-propane-1-one as a photoradical polymerization initiator, 65 parts by weight of a hydrazido curing agent as a latent thermosetting agent (Amicure VDH manufactured by Ajinomoto Fine-Techno Co., Inc.), 3 parts by weight of γ-glycidoxypropyltrimethoxysilane, 6 parts by weight of talc, and 0.5 parts by weight of dibutylhydroxytoluene as an antioxidant were mixed with each other by stirring into an homogeneous liquid. The mixture was further subjected to mixing in a ceramic three-roll mill and then subjected to defoaming and mixing by stirring with a planetary stirring machine, thereby producing a sealant (2). The sealant (2) had the following properties.

Hydrogen-bonding Functional Group Value: $3.7 \times 10^{-3}$
Specific Resistance of Sealant before Curing (Ω·cm): $2.4 \times 10^{7}$
Volume Resistivity of Sealant after Curing (Ω·cm): $1.3 \times 10^{13}$ Sealant (3)

With a planetary stirring machine, 60 parts by weight of the acrylic acid-modified phenol novolac epoxy resin (E), 29 parts by weight of the urethane-modified acrylic epoxy resin (F), 1.5 parts by weight of 2,2-diethoxyacetophenone as a photopolymerization initiator, 22 parts by weight of a hydrazido curing agent as a latent thermosetting agent (Amicure VDH manufactured by Ajinomoto Fine-Techno Co., Inc.), 1.5 parts by weight of γ-glycidoxypropyltrimethoxysilane, and 34 parts by weight of silica particles (average particle size of 1.5 μm) were mixed with each other and stirred. The mixture was further subjected to mixing in a ceramic three-roll mill and then subjected to defoaming and mixing by stirring with a planetary stirring machine, thereby producing a sealant (3). The sealant (3) had the following properties.

Hydrogen-bonding Functional Group Value: $4.3 \times 10^{-3}$
Specific Resistance of Sealant before Curing (Ω·cm): $2.1 \times 10^{9}$
Volume Resistivity of Sealant after Curing (Ω·cm): $1.8 \times 10^{13}$ Sealant (4)

As curable resins, 35 parts by weight of the acrylic acid-modified bisphenol A epoxy resin (B), 30 parts by weight of a caprolactone-modified bisphenol A epoxy acrylate ("EBECRYL 3708" manufactured by DAICEL-CYTEC Company, Ltd.), and 25 parts by weight of an acrylic acid-modified bisphenol F epoxy resin (KRM8287 manufactured by DAICEL-CYTEC Company, Ltd.) were mixed with each other. Then, 2 parts by weight of 2,2-dimethoxy-2-phenylacetophenone as a photopolymerization initiator, 6 parts by weight of sebacic dihydrazide ("SDN" manufactured by Otsuka Chemical Co., Ltd.) as a thermosetting agent, 25 parts by weight of silica (SO-C1 manufactured by Admatechs Company Limited) as a filler, 2 parts by weight of γ-glycidoxypropyltrimethoxysilane ("KBM-403" manufactured by Shin-Etsu Chemical Co., Ltd.) as a silane coupling agent, and 17 parts by weight of fine particles of a core-shell acrylate copolymer (F351 manufactured by Gants Chemical Co., Ltd.) were mixed therewith and stirred with a planetary stirring machine. The mixture was further subjected to mixing in a ceramic three-roll mill and then subjected to defoaming and mixing by stirring with a planetary stirring machine, thereby producing a sealant (4). The sealant (4) had the following properties.

Hydrogen-bonding Functional Group Value: $4.1 \times 10^{-3}$
Specific Resistance of Sealant before Curing (Ω·cm): $8.9 \times 10^{8}$
Volume Resistivity of Sealant after Curing (Ω·cm): $1.7 \times 10^{13}$ Sealant (5)

With a planetary stirring machine, 50 parts by weight of the methacrylic acid-modified bisphenol E epoxy resin (D), 50 parts by weight of the urethane-modified methacrylic epoxy resin (G), 1.5 parts by weight of 2,2-diethoxyacetophenone as a photopolymerization initiator, 18 parts by weight of a hydrazido curing agent as a latent thermosetting agent (Amicure VDH manufactured by Ajinomoto Fine-Techno Co., Inc.), 1.5 parts by weight of γ-glycidoxypropyltrimethoxysilane, and 35 parts by weight of silica particles (SO-C1 manufactured by Admatechs Company Limited) were mixed with each other and stirred. The mixture was further subjected to mixing in a ceramic three-roll mill and then subjected to defoaming and mixing by stirring with a planetary stirring machine, thereby producing a sealant (5). The sealant (5) had the following properties.

Hydrogen-bonding Functional Group Value: $3.6 \times 10^{-3}$
Specific Resistance of Sealant before Curing ($\Omega \cdot cm$): $4.1 \times 10^{6}$
Volume Resistivity of Sealant after Curing ($\Omega \cdot cm$): $1.1 \times 10^{13}$ Comparative Sealant (C1)

A curable resin composition composed of 35 parts by weight of urethane acrylate (AH-600 manufactured by kyoeisha Chemical Co., Ltd.), 15 parts by weight of 2-hydroxybutyl acrylate, 50 parts by weight of isobornyl acrylate, and 3 parts by weight of benzophenone was prepared and stirred with a planetary stirring machine. The composition was homogeneously mixed in a ceramic three-roll mill to produce a photocurable comparative sealant (C1). The comparative sealant (C1) had the following properties.

Hydrogen-bonding Functional Group Value: $2.2 \times 10^{-5}$
Specific Resistance of Sealant before Curing ($\Omega \cdot cm$): $6.0 \times 10^{5}$
Volume Resistivity of Sealant after Curing ($\Omega \cdot cm$): $1.2 \times 10^{13}$ Comparative Sealant (C2)

A curable resin composition composed of 50 parts by weight a bisphenol A epoxy resin (jER828US manufactured by Mitsubishi Chemical Corporation) and 25 parts by weight of a hydrazido curing agent (NDH manufactured by Japan Hydrazine company, Inc.) was prepared and stirred with a planetary stirring machine. The composition was homogeneously mixed in a ceramic three-roll mill to produce a comparative sealant (C2). The comparative sealant (C2) had the following properties.

Hydrogen-bonding Functional Group Value: $2.7 \times 10^{-7}$
Specific Resistance of Sealant before Curing ($\Omega \cdot cm$): $5.0 \times 10^{10}$
Volume Resistivity of Sealant after Curing ($\Omega \cdot cm$): $3.0 \times 10^{13}$ Examples 1 to 5

A transparent electrode was formed on a first substrate, a black matrix (BM) was provided to a second substrate, horizontal alignment films (AL-1051) were provided on the facing sides of the substrates, and then alignment treatment was carried out. The sealants (1) to (5) were individually put into the syringes of dispensers, defoamed, and then applied from the dispensers to the alignment-film-side surface of the first substrate in the form of a rectangular frame. In a state in which the sealant was not cured, fine droplets of a liquid crystal composition 1 shown below were dropped onto the entire surface of the first substrate within the frame, and the second substrate was immediately attached thereto with a vacuum bonding machine under a vacuum of 5 Pa. The conditions of the application of the sealant and the gap between the substrates were adjusted to satisfy the following requirements: after the release of the vacuum, the width of the compressed sealant was approximately 1.2 mm, and 0.3-mm part of the width overlapped the BM. Then, the sealed portion was promptly irradiated with ultraviolet emitted from a high pressure mercury lamp from the second substrate side at an intensity of 100 mW/cm² for 30 seconds, and liquid crystal annealing was subsequently carried out at 120° C. for an hour for thermal curing, thereby producing IPS liquid crystal display devices of Examples 1 to 5 ($d_{gap}=4.0$ µm). Table 2 shows the physical properties of the liquid crystal composition 1. The VHR of each of the liquid crystal display devices was measured. Each of the liquid crystal display devices was subjected to evaluations of uneven alignment and screen burn-in. Table 3 shows results of the measurement and evaluations.

[Chem. 22]

| Chemical Structure | Percentage | Abbreviation |
|---|---|---|
| 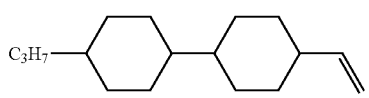 | 48% | 3-Cy—Cy-1d0 |
| 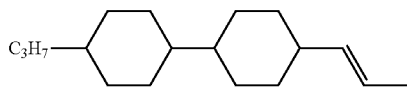 | 4% | 3-Cy—Cy-1d1 |
| 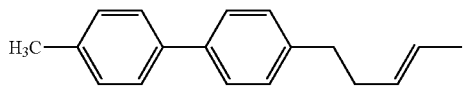 [SMILES: C/C=C/CCc1ccc(-c2ccc(C)cc2)cc1] | 8% | 1-Ph—Ph-3d1 |
| 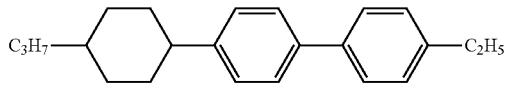 | 5% | 3-Cy—Ph—Ph-2 |
| 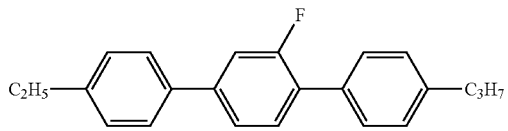 | 5% | 2-Ph—Ph1—Ph-3 |

-continued

[Chem. 22]

| Chemical Structure | Percentage | Abbreviation |
|---|---|---|
| 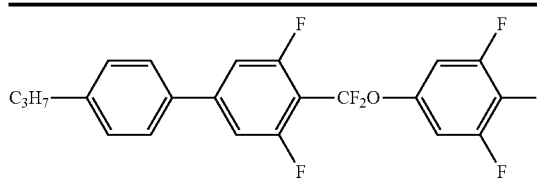 | 2% | 3-Ph—Ph3—CFFO—Ph3—F |
| 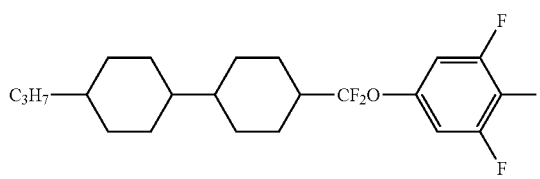 | 3% | 3-Cy—Cy—CFFO—Ph3—F |
| 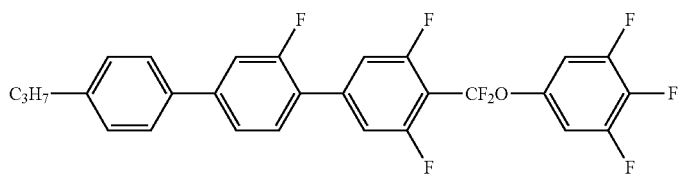 | 7% | 3-Ph—Ph1—Ph3—CFFO—Ph3—F |
| 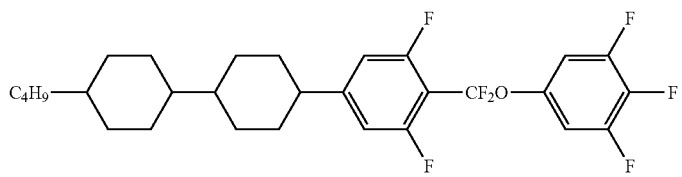 | 5% | 4-Cy—Cy—Ph3—CFFO—Ph3—F |

TABLE 2

| | |
|---|---|
| $T_{NI}/°C.$ | 75.8 |
| $\Delta n$ | 0.112 |
| $n_o$ | 1.488 |
| $\epsilon_\perp$ | 5.5 |
| $\Delta \epsilon$ | 2.9 |
| $\eta$/mPa · s | 13.5 |

TABLE 3

| | Example 1 | Example 2 | Example 3 | Example 4 | Example 5 |
|---|---|---|---|---|---|
| Liquid crystal composition | Liquid crystal composition 1 | Liquid crystal composition 1 | Liquid crystal composition 1 | Liquid crystal composition 1 | Liquid crystal composition 1 |
| Sealant | Sealant (1) | Sealant (2) | Sealant (3) | Sealant (4) | Sealant (5) |
| VHR | 99.5 | 99.1 | 99.4 | 99.2 | 99.0 |
| Uneven alignment | Excellent | Excellent | Excellent | Excellent | Good |
| Screen burn-in | Excellent | Excellent | Excellent | Excellent | Excellent |

In the liquid crystal composition 1, the temperature range of the liquid crystal layer was 75.8° C., which was practical for a liquid crystal composition used in TVs; in addition, the liquid crystal composition 1 had a dielectric anisotropy with a large absolute value, low viscosity, and proper Δn.

The liquid crystal display devices of Examples 1 to 5 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 6 to 15

As in Example 1, liquid crystal compositions 2 and 3 shown in the Table 4 were individually disposed between substrates, the sealants (1) to (5) were used to produce liquid crystal display devices of Examples 6 to 15, and the VHRs thereof were measured. The liquid crystal display devices were subjected to the evaluations of uneven alignment and screen burn-in. Tables 5 and 6 show results of the measurement and evaluations.

TABLE 4

| Liquid crystal composition 2 | | Liquid crystal composition 3 | |
|---|---|---|---|
| Compound | Content (%) | Compound | Content (%) |
| 4-Cy-Cy-1d0 | 15 | 5-Cy-Cy-1d0 | 5 |
| 0d1-Cy-Cy-Ph-1 | 4 | 3-Cy-Cy-1d1 | 10 |
| 0d3-Cy-Cy-Ph-1 | 14 | 0d1-Cy-Cy-Ph-1 | 8 |

TABLE 4-continued

| Liquid crystal composition 2 | | Liquid crystal composition 3 | |
|---|---|---|---|
| Compound | Content (%) | Compound | Content (%) |
| 3-Cy-Ph-Ph-Cy-3 | 3 | 5-Cy-Cy-Ph-O1 | 6 |
| 3-Cy-Ph-Ph1-Cy-3 | 4 | 2-Ph-Ph1-Ph-3 | 8 |
| 1-Cy-Cy-Ph3-F | 9 | 2-Cy-Cy-Ph3-F | 11 |
| 2-Cy-Ph-Ph3-F | 10 | 3-Cy-Cy-Ph3-F | 15 |
| 3-Cy-Ph-Ph3-F | 10 | 5-Cy-Cy-Ph3-F | 5 |
| 5-Cy-Ph-Ph3-F | 5 | 3-Cy-Ph-Ph3-F | 6 |
| 0d1-Cy-Cy-Ph1-F | 8 | 3-Cy-Ph-Ph1-F | 9 |
| 3-Cy-Cy-Ph1-Ph3-F | 8 | 4-Cy-Cy-Ph-OCFFF | 4 |
| 2-Ph-Ph3-CFFO-Ph3-F | 4 | 3-Cy-Cy-CFFO-Ph3-F | 7 |
| 3-Ph-Ph3-CFFO-Ph3-F | 6 | 5-Cy-Cy-CFFO-Ph3-F | 4 |
| Tni/° C. | 100.7 | 3-Cy-Cy-Ph1-Ph3-F | 2 |
| Δn | 0.094 | Tni/° C. | 103.2 |
| Δε | 8.0 | Δn | 0.102 |
| γ1/mPa · s | 108 | Δε | 7.1 |
| η/mPa · s | 22.2 | γ1/mPa · s | 96 |
| | | η/mPa · s | 20.8 |

TABLE 5

| | Example 6 | Example 7 | Example 8 | Example 9 | Example 10 |
|---|---|---|---|---|---|
| Liquid crystal composition | Liquid crystal composition 2 | Liquid crystal composition 2 | Liquid crystal composition 2 | Liquid crystal composition 2 | Liquid crystal composition 2 |
| Sealant | Sealant (1) | Sealant (2) | Sealant (3) | Sealant (4) | Sealant (5) |
| VHR | 99.4 | 99.1 | 99.3 | 99.3 | 99.0 |
| Uneven alignment | Excellent | Good | Excellent | Excellent | Good |
| Screen burn-in | Excellent | Excellent | Excellent | Excellent | Excellent |

TABLE 6

| | Example 11 | Example 12 | Example 13 | Example 14 | Example 15 |
|---|---|---|---|---|---|
| Liquid crystal composition | Liquid crystal composition 3 | Liquid crystal composition 3 | Liquid crystal composition 3 | Liquid crystal composition 3 | Liquid crystal composition 3 |
| Sealant | Sealant (1) | Sealant (2) | Sealant (3) | Sealant (4) | Sealant (5) |
| VHR | 99.5 | 99.2 | 99.5 | 99.3 | 99.0 |
| Uneven alignment | Excellent | Excellent | Excellent | Excellent | Good |
| Screen burn-in | Excellent | Excellent | Excellent | Excellent | Good |

In each of the liquid crystal compositions 2 and 3, the temperature range of the liquid crystal layer was practical for liquid crystal compositions used in TVs; in addition, each liquid crystal composition had a dielectric anisotropy with a large absolute value, low viscosity, and proper Δn.

The liquid crystal display devices of Examples 6 to 15 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 16 to 30

As in Example 1, liquid crystal compositions 4 to 6 shown in the Table 7 were individually disposed between substrates, the sealants (1) to (5) were used to produce liquid crystal display devices of Examples 16 to 30, and the VHRs and ID) thereof were measured. The liquid crystal display devices were subjected to the evaluations of uneven alignment and screen burn-in. Tables 8 to 10 show results of the measurements and evaluations.

TABLE 7

| Liquid crystal composition 4 | | Liquid crystal composition 5 | |
|---|---|---|---|
| Compound | Content (%) | Compound | Content (%) |
| 5-Cy-Cy-1d0 | 15 | 5-Cy-Cy-1d0 | 10 |
| 3-Cy-Cy-1d1 | 2 | 3-Cy-Cy-1d1 | 5 |
| 0d1-Cy-Cy-Ph-1 | 12 | 0d1-Cy-Cy-Ph-1 | 8 |
| 2-Ph-Ph1-Ph-3 | 3 | 0d3-Cy-Cy-Ph-1 | 12 |
| 2-Ph-Ph1-Ph-4 | 3 | 2-Ph-Ph1-Ph-5 | 2 |
| 2-Cy-Cy-Ph3-F | 8 | 3-Cy-Ph-Ph-Cy-3 | 3 |
| 2-Cy-Ph-Ph3-F | 3 | 3-Cy-Ph-Ph1-Cy-3 | 3 |
| 3-Cy-Ph-Ph3-F | 9 | 1-Cy-Cy-Ph3-F | 9 |
| 4-Cy-Cy-Ph-OCFFF | 14 | 2-Cy-Cy-Ph3-F | 10 |
| 3-Ph-Ph3-CFFO-Ph3-F | 11 | 3-Cy-Cy-Ph3-F | 6 |
| 2-Cy-Cy-CFFO-Ph3-F | 9 | 5-Cy-Cy-Ph3-F | 5 |
| 3-Cy-Cy-CFFO-Ph3-F | 8 | 0d1-Cy-Cy-Ph1-F | 8 |
| 3-Cy-Cy-Ph1-Ph3-F | 3 | 2-Ph-Ph3-CFFO-Ph3-F | 4 |

TABLE 7-continued

| Tni/° C. | 90.2 | 3-Ph-Ph3-CFFO-Ph3-F | 6 |
|---|---|---|---|
| Δn | 0.098 | 3-Cy-Cy-Ph1-Ph3-F | 9 |
| Δε | 9.1 | Tni/° C. | 110.0 |
| γ1/mPa · s | 90 | Δn | 0.099 |
| η/mPa · s | 18.1 | Δε | 8.3 |
| | | γ1/mPa · s | 112 |
| | | η/mPa · s | 23.4 |

| Liquid crystal composition 6 | |
|---|---|
| Compound | Content (%) |
| 5-Cy-Cy-1d0 | 12 |
| 3-Cy-Cy-1d1 | 25 |
| 3-Cy-Cy-1d1 | 12 |
| 0d1-Cy-Cy-Ph-1 | 4 |
| 0d3-Cy-Cy-Ph-1 | 9 |
| 2-Ph-Ph1-Ph3-F | 5 |
| 3-Ph-Ph1-Ph3-F | 9 |
| 2-Ph-Ph3-CFFO-Ph3-F | 4 |
| 3-Ph-Ph3-CFFO-Ph3-F | 6 |

TABLE 7-continued

| | |
|---|---|
| 3-Cy-Cy-CFFO-Ph3-F | 2 |
| 5-Cy-Cy-CFFO-Ph3-F | 3 |
| 3-Cy-Cy-Ph1-Ph3-F | 9 |
| Tni/° C. | 77.4 |
| Δn | 0.101 |
| Δε | 7.0 |
| γ1/mPa · s | 86 |
| η/mPa · s | 14.2 |

TABLE 8

| | Example 16 | Example 17 | Example 18 | Example 19 | Example 20 |
|---|---|---|---|---|---|
| Liquid crystal composition | Liquid crystal composition 4 | Liquid crystal composition 4 | Liquid crystal composition 4 | Liquid crystal composition 4 | Liquid crystal composition 4 |
| Sealant | Sealant (1) | Sealant (2) | Sealant (3) | Sealant (4) | Sealant (5) |
| VHR | 99.5 | 99.2 | 99.3 | 99.3 | 99.1 |
| Uneven alignment | Excellent | Excellent | Excellent | Excellent | Excellent |
| Screen burn-in | Excellent | Excellent | Excellent | Excellent | Good |

TABLE 9

| | Example 21 | Example 22 | Example 23 | Example 24 | Example 25 |
|---|---|---|---|---|---|
| Liquid crystal composition | Liquid crystal composition 5 | Liquid crystal composition 5 | Liquid crystal composition 5 | Liquid crystal composition 5 | Liquid crystal composition 5 |
| Sealant | Sealant (1) | Sealant (2) | Sealant (3) | Sealant (4) | Sealant (5) |
| VHR | 99.6 | 99.3 | 99.5 | 99.4 | 99.1 |
| Uneven alignment | Excellent | Good | Excellent | Excellent | Good |
| Screen burn-in | Excellent | Excellent | Excellent | Excellent | Good |

TABLE 10

| | Example 26 | Example 27 | Example 28 | Example 29 | Example 30 |
|---|---|---|---|---|---|
| Liquid crystal composition | Liquid crystal composition 6 | Liquid crystal composition 6 | Liquid crystal composition 6 | Liquid crystal composition 6 | Liquid crystal composition 6 |
| Sealant | Sealant (1) | Sealant (2) | Sealant (3) | Sealant (4) | Sealant (5) |
| VHR | 99.5 | 99.2 | 99.5 | 99.4 | 99.0 |
| Uneven alignment | Excellent | Good | Excellent | Excellent | Excellent |
| Screen burn-in | Excellent | Excellent | Excellent | Excellent | Good |

In each of the liquid crystal compositions 4 to 6, the temperature range of the liquid crystal layer was practical for liquid crystal compositions used in TVs; in addition, each liquid crystal composition had a dielectric anisotropy with a large absolute value, low viscosity, and proper Δn.

The liquid crystal display devices of Examples 16 to 30 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 31 to 45

Transparent electrodes were formed on first and second substrates, a black matrix (BM) was provided to the second substrate, horizontal alignment films (SE-7492) were provided on the facing sides of the substrates, and then alignment treatment was carried out. Liquid crystal compositions 7 to 9 shown in Table 11 were individually disposed between the substrates as in Example 1, and the sealants (1) to (5) were used to produce TN liquid crystal display devices of Examples 31 to 45 ($d_{gap}$=3.5 μm). The VHRs and ID thereof were measured. The liquid crystal display devices were subjected to the evaluations of uneven alignment and screen burn-in. Tables 12 to 14 show results of the measurements and evaluations.

TABLE 11

| Liquid crystal composition 7 | | Liquid crystal composition 8 | |
|---|---|---|---|
| Compound | Content (%) | Compound | Content (%) |
| 3-Cy-Cy-1d0 | 38 | 3-Cy-Cy-1d0 | 38 |
| 3-Cy-Cy-1d1 | 9 | 3-Cy-Cy-1d1 | 14 |
| 0d1-Cy-Cy-Ph-1 | 16 | 0d3-Cy-Cy-Ph-1 | 8 |
| 0d3-Cy-Cy-Ph-1 | 4 | 3-Ph-Ph3-CFFO-Ph3-F | 9 |
| 2-Ph-Ph3-CFFO-Ph3-F | 2 | 3-Cy-Cy-CFFO-Ph3-F | 15 |
| 3-Ph-Ph3-CFFO-Ph3-F | 12 | 3-Ph-Ph1-Ph3-CFFO-Ph3-F | 2 |
| 3-Cy-Cy-CFFO-Ph3-F | 7 | 4-Ph-Ph1-Ph3-CFFO-Ph3-F | 7 |
| 3-Ph-Ph-Ph1-Ph3-F | 1 | 5-Ph-Ph1-Ph3-CFFO-Ph3-F | 7 |
| 3-Ph-Ph1-Ph3-CFFO-Ph3-F | 2 | Tni/° C. | 81.8 |
| 2-Py-Ph-Ph3-CFFO-Ph3-F | 9 | Δn | 0.099 |
| Tni/° C. | 76.0 | Δε | 8.0 |
| Δn | 0.097 | γ1/mPa · s | 83 |
| Δε | 6.8 | η/mPa · s | 14.6 |
| γ1/mPa · s | 83 | | |
| η/mPa · s | 14.5 | | |

TABLE 11-continued

Liquid crystal composition 9

| Compound | Content (%) |
|---|---|
| 3-Cy-Cy-1d0 | 30 |
| 3-Cy-Cy-1d1 | 17 |
| 0d1-Cy-Cy-Ph-1 | 7 |
| 0d3-Cy-Cy-Ph-1 | 7 |
| 3-Cy-Cy-Ph-2 | 2 |
| 2-Ph-Ph1-Ph-4 | 2 |
| 2-Ph-Ph1-Ph3-F | 8 |
| 3-Ph-Ph1-Ph3-F | 12 |
| 3-Ph-Ph3-Ph3-F | 4 |
| 3-Cy-Cy-Ph1-CFFO-Ph3-F | 11 |
| Tni/° C. | 75.0 |
| $\Delta n$ | 0.112 |
| $\Delta \epsilon$ | 8.7 |
| $\gamma 1/mPa \cdot s$ | 87 |
| $\eta/mPa \cdot s$ | 15.2 |

TABLE 12

| | Example 31 | Example 32 | Example 33 | Example 34 | Example 35 |
|---|---|---|---|---|---|
| Liquid crystal composition | Liquid crystal composition 7 | Liquid crystal composition 7 | Liquid crystal composition 7 | Liquid crystal composition 7 | Liquid crystal composition 7 |
| Sealant | Sealant (1) | Sealant (2) | Sealant (3) | Sealant (4) | Sealant (5) |
| VHR | 99.5 | 99.3 | 99.4 | 99.3 | 99.1 |
| Uneven alignment | Excellent | Excellent | Excellent | Excellent | Good |
| Screen burn-in | Excellent | Excellent | Excellent | Excellent | Excellent |

TABLE 13

| | Example 36 | Example 37 | Example 38 | Example 39 | Example 40 |
|---|---|---|---|---|---|
| Liquid crystal composition | Liquid crystal composition 8 | Liquid crystal composition 8 | Liquid crystal composition 8 | Liquid crystal composition 8 | Liquid crystal composition 8 |
| Sealant | Sealant (1) | Sealant (2) | Sealant (3) | Sealant (4) | Sealant (5) |
| VHR | 99.4 | 99.2 | 99.4 | 99.3 | 99.0 |
| Uneven alignment | Excellent | Excellent | Excellent | Excellent | Good |
| Screen burn-in | Excellent | Good | Excellent | Excellent | Good |

TABLE 14

| | Example 41 | Example 42 | Example 43 | Example 44 | Example 45 |
|---|---|---|---|---|---|
| Liquid crystal composition | Liquid crystal composition 9 | Liquid crystal composition 9 | Liquid crystal composition 9 | Liquid crystal composition 9 | Liquid crystal composition 9 |
| Sealant | Sealant (1) | Sealant (2) | Sealant (3) | Sealant (4) | Sealant (5) |
| VHR | 99.6 | 99.3 | 99.5 | 99.3 | 99.1 |
| Uneven alignment | Excellent | Good | Excellent | Excellent | Good |
| Screen burn-in | Excellent | Excellent | Excellent | Excellent | Excellent |

In each of the liquid crystal compositions 7 to 9, the temperature range of the liquid crystal layer was practical for liquid crystal compositions used in TVs; in addition, each liquid crystal composition had a dielectric anisotropy with a large absolute value, low viscosity, and proper $\Delta n$.

The liquid crystal display devices of Examples 31 to 45 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 46 to 55

A transparent electrode was formed on a first substrate, a black matrix (BM) was provided to a second substrate, horizontal alignment films (AL-1051) were provided on the facing sides of the substrates, and then alignment treatment was carried out. Liquid crystal compositions 10 and 11 shown in Table 15 were individually disposed between the substrates as in Example 1, and the sealants (1) to (5) were used to produce FFS liquid crystal display devices of Examples 46 to 55 ($d_{gap}$=4.0 µm). The VHRs and ID thereof were measured. The liquid crystal display devices were subjected to the evaluations of uneven alignment and screen burn-in. Tables 16 and 17 show results of the measurements and evaluations.

TABLE 15

| Liquid crystal composition 10 | | Liquid crystal composition 11 | |
|---|---|---|---|
| Compound | Content (%) | Compound | Content (%) |
| 3-Cy-Cy-1d0 | 39 | 3-Cy-Cy-1d0 | 44 |
| 3-Cy-Cy-1d1 | 7 | 3-Cy-Cy-1d1 | 3 |
| 0d1-Cy-Cy-Ph-1 | 11 | 2-Ph-Ph-3d1 | 13 |
| 2-Ph-Ph1-Ph-3 | 8 | 3-Cy-Ph-Ph-2 | 7 |
| 2-Ph-Ph1-Ph-5 | 8 | 2-Ph-Ph1-Ph-3 | 8 |
| 3-Ph-Ph3-CFFO-Ph3-F | 10 | 3-Ph-Ph1-Ph-3 | 7 |

TABLE 15-continued

| Liquid crystal composition 10 | | Liquid crystal composition 11 | |
|---|---|---|---|
| Compound | Content (%) | Compound | Content (%) |
| 3-Cy-Cy-Ph-Ph3-F | 6 | 3-Ph-Ph1-Ph3-CFFO-Ph3-F | 9 |
| 4-Ph-Ph1-Ph3-CFFO-Ph3-F | 11 | 4-Cy-Cy-Ph1-CFFO-Ph3-F | 3 |
| Tni/° C. | 76.0 | 3-Cy-Ph3-Ph1-OCFFF | 6 |
| $\Delta n$ | 0.114 | Tni/° C. | 77.9 |
| $\Delta \epsilon$ | 6.0 | $\Delta n$ | 0.131 |
| $\gamma 1/mPa \cdot s$ | 77 | $\Delta \epsilon$ | 4.6 |
| $\eta/mPa \cdot s$ | 13.3 | $\gamma 1/mPa \cdot s$ | 74 |
| | | $\eta/mPa \cdot s$ | 12.4 |

TABLE 16

| | Example 46 | Example 47 | Example 48 | Example 49 | Example 50 |
|---|---|---|---|---|---|
| Liquid crystal composition | Liquid crystal composition 10 | Liquid crystal composition 10 | Liquid crystal composition 10 | Liquid crystal composition 10 | Liquid crystal composition 10 |
| Sealant | Sealant (1) | Sealant (2) | Sealant (3) | Sealant (4) | Sealant (5) |
| VHR | 99.6 | 99.3 | 99.6 | 99.5 | 99.2 |
| Uneven alignment | Excellent | Excellent | Excellent | Excellent | Excellent |
| Screen burn-in | Excellent | Excellent | Excellent | Excellent | Excellent |

TABLE 17

| | Example 51 | Example 52 | Example 53 | Example 54 | Example 55 |
|---|---|---|---|---|---|
| Liquid crystal composition | Liquid crystal composition 11 | Liquid crystal composition 11 | Liquid crystal composition 11 | Liquid crystal composition 11 | Liquid crystal composition 11 |
| Sealant | Sealant (1) | Sealant (2) | Sealant (3) | Sealant (4) | Sealant (5) |
| VHR | 99.5 | 99.3 | 99.5 | 99.3 | 99.0 |
| Uneven alignment | Excellent | Good | Excellent | Good | Good |
| Screen burn-in | Excellent | Excellent | Excellent | Excellent | Good |

In each of the liquid crystal compositions 10 and 11, the temperature range of the liquid crystal layer was practical for liquid crystal compositions used in TVs; in addition, each liquid crystal composition had a dielectric anisotropy with a large absolute value, low viscosity, and proper $\Delta n$.

The liquid crystal display devices of Examples 46 to 55 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 56 to 65

Liquid crystal compositions 12 and 13 shown in Table 18 were individually disposed between the substrates as in Example 46, and the sealants (1) to (5) were used to produce FFS liquid crystal display devices of Examples 56 to 65. The VHRs thereof were measured. The liquid crystal display devices were subjected to the evaluations of uneven alignment and screen burn-in. Tables 19 and 20 show results of the measurement and evaluations.

TABLE 18

| Liquid crystal composition 12 | | Liquid crystal composition 13 | |
|---|---|---|---|
| Compound | Content (%) | Compound | Content (%) |
| 3-Cy-Cy-1d0 | 47 | 3-Cy-Cy-1d0 | 10 |
| 3-Cy-Cy-1d1 | 9 | 3-Cy-Cy-1d1 | 6 |
| 3-Cy-Cy-Ph-2 | 7 | 3-Cy-Cy-1d1-F | 28 |
| 2-Ph-Ph1-Ph-3 | 4 | 0d1-Cy-Cy-Ph-1 | 11 |
| 2-Ph-Ph1-Ph-5 | 7 | 0d3-Cy-Cy-Ph-1 | 10 |
| 3-Cy-Ph-Ph-Cy-3 | 2 | 2-Ph-Ph1-Ph-3 | 10 |
| 2-Ph-Ph1-Ph-3 | 6 | 2-Ph-Ph1-Ph-5 | 10 |

TABLE 18-continued

| Liquid crystal composition 12 | | Liquid crystal composition 13 | |
|---|---|---|---|
| Compound | Content (%) | Compound | Content (%) |
| 3-Ph-Ph1-Ph-3 | 7 | 5-Cy-Ph-Ph1-Ph-2 | 2 |
| 3-Ph-Ph3-CFFO-Ph3-F | 2 | 3-Ph-Ph3-CFFO-Ph3-F | 7 |
| 3-Cy-Cy-Ph1-Ph3-F | 2 | 3-Cy-Cy-Ph1-CFFO-Ph3-F | 6 |
| 3-Cy-Ph-Ph3-Ph1-OCFFF | 7 | Tni/° C. | 80.0 |
| Tni/° C. | 80.6 | $\Delta n$ | 0.110 |
| $\Delta n$ | 0.122 | $\Delta \epsilon$ | 5.9 |
| $\Delta \epsilon$ | 6.0 | $\gamma 1/mPa \cdot s$ | 68 |
| $\gamma 1/mPa \cdot s$ | 65 | $\eta/mPa \cdot s$ | 11.6 |
| $\eta/mPa \cdot s$ | 11.1 | | |

TABLE 19

| | Example 56 | Example 57 | Example 58 | Example 59 | Example 60 |
|---|---|---|---|---|---|
| Liquid crystal composition | Liquid crystal composition 12 | Liquid crystal composition 12 | Liquid crystal composition 12 | Liquid crystal composition 12 | Liquid crystal composition 12 |

TABLE 19-continued

|  | Example 56 | Example 57 | Example 58 | Example 59 | Example 60 |
|---|---|---|---|---|---|
| Sealant | Sealant (1) | Sealant (2) | Sealant (3) | Sealant (4) | Sealant (5) |
| VHR | 99.7 | 99.3 | 99.6 | 99.5 | 99.2 |
| Uneven alignment | Excellent | Excellent | Excellent | Excellent | Excellent |
| Screen burn-in | Excellent | Excellent | Excellent | Excellent | Excellent |

TABLE 20

|  | Example 61 | Example 62 | Example 63 | Example 64 | Example 65 |
|---|---|---|---|---|---|
| Liquid crystal composition | Liquid crystal composition 13 | Liquid crystal composition 13 | Liquid crystal composition 13 | Liquid crystal composition 13 | Liquid crystal composition 13 |
| Sealant | Sealant (1) | Sealant (2) | Sealant (3) | Sealant (4) | Sealant (5) |
| VHR | 99.6 | 99.3 | 99.4 | 99.3 | 99.1 |
| Uneven alignment | Excellent | Excellent | Excellent | Excellent | Excellent |
| Screen burn-in | Excellent | Excellent | Excellent | Excellent | Good |

In each of the liquid crystal compositions 12 and 13, the temperature range of the liquid crystal layer was practical for liquid crystal compositions used in TVs; in addition, each liquid crystal composition had a dielectric anisotropy with a large absolute value, low viscosity, and proper Δn.

The liquid crystal display devices of Examples 56 to 65 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 66 to 70

To the liquid crystal composition 10 used in Example 46, 0.3 mass % of a bismethacrylic acid biphenyl-4,4'-diyl ester was added to produce a liquid crystal composition 1.4. As in Example 31, the liquid crystal composition 14 was disposed between the substrates and then confined with use of the sealants (1) to (5). In a state in which a driving voltage was applied between the electrodes, ultraviolet was radiated thereto for 600 seconds (3.0 J/cm$^2$) for polymerization, thereby producing TN liquid crystal display devices of Examples 66 to 70. The VHRs of the liquid crystal display devices were measured; in addition, the liquid crystal display devices were subjected to evaluations of uneven alignment and screen burn-in. Table 21 shows results of the measurement and evaluations.

The liquid crystal display devices of Examples 66 to 70 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 71 to 75

To the liquid crystal composition 8 used in Example 36, 0.3 mass % of a bismethacrylic acid biphenyl-4,4'-diyl ester was added to produce a liquid crystal composition 15. As in Example 1, the liquid crystal composition 15 was disposed between the substrates and then confined with use of the sealants (1) to (5). In a state in which a driving voltage was applied between the electrodes, ultraviolet was radiated thereto for 600 seconds (3.0 J/cm$^2$) for polymerization, thereby producing IPS liquid crystal display devices of Examples 71 to 75. The VHRs of the liquid crystal display devices were measured; in addition, the liquid crystal display devices were subjected to evaluations of uneven alignment and screen burn-in. Table 22 shows results of the measurement and evaluations.

TABLE 21

|  | Example 66 | Example 67 | Example 68 | Example 69 | Example 70 |
|---|---|---|---|---|---|
| Liquid crystal composition | Liquid crystal composition 14 | Liquid crystal composition 14 | Liquid crystal composition 14 | Liquid crystal composition 14 | Liquid crystal composition 14 |
| Sealant | Sealant (1) | Sealant (2) | Sealant (3) | Sealant (4) | Sealant (5) |
| VHR | 99.5 | 99.3 | 99.4 | 99.4 | 99.2 |
| Uneven alignment | Excellent | Excellent | Excellent | Excellent | Good |
| Screen burn-in | Excellent | Excellent | Excellent | Excellent | Excellent |

TABLE 22

|  | Example 71 | Example 72 | Example 73 | Example 74 | Example 75 |
|---|---|---|---|---|---|
| Liquid crystal composition | Liquid crystal composition 15 | Liquid crystal composition 15 | Liquid crystal composition 15 | Liquid crystal composition 15 | Liquid crystal composition 15 |
| Sealant | Sealant (1) | Sealant (2) | Sealant (3) | Sealant (4) | Sealant (5) |
| VHR | 99.5 | 99.3 | 99.4 | 99.3 | 99.0 |
| Uneven alignment | Excellent | Excellent | Excellent | Excellent | Good |
| Screen burn-in | Excellent | Excellent | Excellent | Excellent | Good |

The liquid crystal display devices of Examples 71 to 75 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Examples 76 to 80

To the liquid crystal composition 6 used in Example 26, 0.3 mass % of bismethacrylic acid 3-fluorobiphenyl-4,4'-diyl was added to produce a liquid crystal composition 16. As in Example 46, the liquid crystal composition 16 was disposed between the substrates and then confined with use of the sealants (1) to (5). In a state in which a driving voltage was applied between the electrodes, ultraviolet was radiated thereto for 600 seconds (3.0 J/cm$^2$) for polymerization, thereby producing FFS liquid crystal display devices of Examples 76 to 80. The VHRs of the liquid crystal display devices were measured; in addition, the liquid crystal display devices were subjected to evaluations of uneven alignment and screen burn-in. Table 23 shows results of the measurement and evaluations.

TABLE 23

|  | Example 76 | Example 77 | Example 78 | Example 79 | Example 80 |
|---|---|---|---|---|---|
| Liquid crystal composition | Liquid crystal composition 16 | Liquid crystal composition 16 | Liquid crystal composition 16 | Liquid crystal composition 16 | Liquid crystal composition 16 |
| Sealant | Sealant (1) | Sealant (2) | Sealant (3) | Sealant (4) | Sealant (5) |
| VHR | 99.5 | 99.2 | 99.4 | 99.4 | 99.1 |
| Uneven alignment | Excellent | Excellent | Excellent | Excellent | Excellent |
| Screen burn-in | Excellent | Excellent | Excellent | Excellent | Good |

The liquid crystal display devices of Examples 76 to 80 each had a high VHR. In the evaluation of uneven alignment, no uneven alignment was observed, or an acceptable degree of slight uneven alignment was observed, if any. Furthermore, in the evaluation of screen burn-in, no afterimage was observed, or an acceptable degree of slight afterimage was observed, if any.

Comparative Examples 1 to 5

Except that a comparative liquid crystal composition 1 shown below was used in place of the liquid crystal composition 1 in Example 1, IPS liquid crystal display devices of Comparative Examples 1 to 5 were produced as in Example 1, and the VHRs thereof were measured. The liquid crystal display devices were subjected to the evaluations of uneven alignment and screen burn-in. Table 25 shows results of the measurement and evaluations.

[Chem. 23]

| Chemical Structure | Percentage | Abbreviation |
|---|---|---|
| 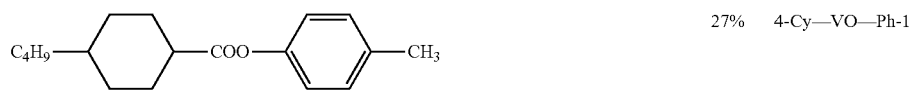 | 27% | 4-Cy—VO—Ph-1 |

[Chem. 23]

| Chemical Structure | Percentage | Abbreviation |
|---|---|---|
| 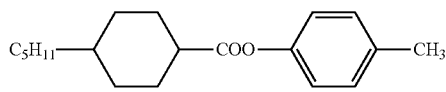 | 20% | 5-Cy—VO—Ph-1 |
| 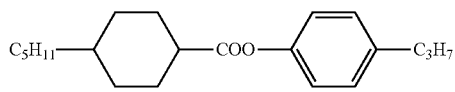 | 20% | 5-Cy—VO—Ph-3 |
| 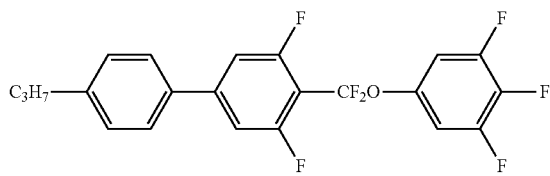 | 8% | 3-Ph—Ph3—CFFO—Ph3—F |
| 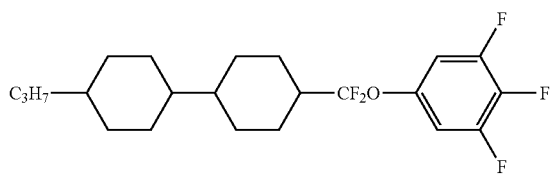 | 13% | 3-Cy—Cy—CFFO—Ph3—F |
| 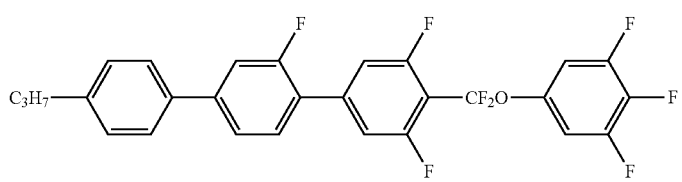 | 12% | 3-Ph—Ph1—Ph3—CFFO—Ph3—F |

TABLE 24

| | |
|---|---|
| $T_{NI}/°C$ | 69.3 |
| $\Delta n$ | 0.096 |
| no | 1.484 |
| $\epsilon_\perp$ | 5.5 |
| $\Delta\epsilon$ | 4.8 |
| $\eta/mPa \cdot s$ | 30.3 |

TABLE 25

| | Comparative Example 1 | Comparative Example 2 | Comparative Example 3 | Comparative Example 4 | Comparative Example 5 |
|---|---|---|---|---|---|
| Liquid crystal composition | Comparative liquid crystal composition 1 | Comparative liquid crystal composition 1 | Comparative liquid crystal composition 1 | Comparative liquid crystal composition 1 | Comparative liquid crystal composition 1 |
| Sealant | Sealant (1) | Sealant (2) | Sealant (3) | Sealant (4) | Sealant (5) |
| VHR | 98.2 | 97.5 | 97.9 | 97.7 | 97.2 |
| Uneven alignment | Bad | Poor | Poor | Poor | Poor |
| Screen burn-in | Bad | Poor | Bad | Poor | Poor |

Each of the liquid crystal display devices of Comparative Examples 1 to 5 had a lower VHF than the liquid crystal display device of the present invention. In the evaluation of uneven alignment, an unacceptable degree of uneven alignment was observed. Furthermore, in the evaluation of screen burn-in, an unacceptable degree of afterimages was observed.

Comparative Examples 6 to 15

Except that comparative liquid crystal compositions 2 and 3 shown below were used in place of the comparative liquid crystal composition 1, IPS liquid crystal display devices of Comparative Examples 6 to 15 were produced as in Comparative Example 1, and the VHRs thereof were measured. The liquid crystal display devices were subjected to the evaluations of uneven alignment and screen burn-in. Tables 27 and 28 show results of the measurement and evaluations.

TABLE 26

| Comparative liquid crystal composition 2 | | Comparative liquid crystal composition 3 | |
|---|---|---|---|
| Compound | Content (%) | Compound | Content (%) |
| 2-Cy-Cy-Ph3-F | 12 | 2-Cy-Cy-Ph3-F | 12 |
| 3-Cy-Cy-Ph3-F | 10 | 3-Cy-Cy-Ph3-F | 10 |
| 5-Cy-Cy-Ph3-F | 6 | 2-Cy-Cy-Ph-OCFFF | 8 |
| 2-Cy-Cy-Ph-OCFFF | 9 | 3-Cy-Cy-Ph-OCFFF | 8 |
| 3-Cy-Cy-Ph-OCFFF | 8 | 4-Cy-Cy-Ph-OCFFF | 7 |
| 4-Cy-Cy-Ph-OCFFF | 7 | 5-Cy-Cy-Ph-OCFFF | 4 |
| 2-Cy-Ph1-Ph3-F | 12 | 2-Cy-Ph1-Ph3-F | 12 |
| 3-Cy-Ph1-Ph3-F | 10 | 3-Cy-Ph1-Ph3-F | 4 |
| 2-Cy-Py-Cy-CFFO-Ph3-F | 5.5 | 2-Cy-Cy-CFFO-Ph3-F | 12 |
| 2-Ph-Ph1-Ph3-F | 5.5 | 2-Ph-Ph1-Ph3-F | 8 |
| 0d1-Cy-Cy-CFFO-Ph3-F | 15 | 0d1-Cy-Cy-CFFO-Ph3-F | 15 |
| Tni/° C. | 75.7 | Tni/° C. | 75.0 |
| $\Delta n$ | 0.093 | $\Delta n$ | 0.093 |
| $\gamma 1$/mPa·s | 146 | $\gamma 1$/mPa·s | 139 |

TABLE 27

| | Comparative Example 6 | Comparative Example 7 | Comparative Example 8 | Comparative Example 9 | Comparative Example 10 |
|---|---|---|---|---|---|
| Liquid crystal composition | Comparative liquid crystal composition 2 | Comparative liquid crystal composition 2 | Comparative liquid crystal composition 2 | Comparative liquid crystal composition 2 | Comparative liquid crystal composition 2 |
| Sealant | Sealant (1) | Sealant (2) | Sealant (3) | Sealant (4) | Sealant (5) |
| VHR | 98.1 | 97.5 | 98.0 | 97.8 | 97.3 |
| Uneven alignment | Bad | Poor | Bad | Poor | Poor |
| Screen burn-in | Bad | Poor | Bad | Poor | Poor |

TABLE 28

| | Comparative Example 11 | Comparative Example 12 | Comparative Example 13 | Comparative Example 14 | Comparative Example 15 |
|---|---|---|---|---|---|
| Liquid crystal composition | Comparative liquid crystal composition 3 | Comparative liquid crystal composition 3 | Comparative liquid crystal composition 3 | Comparative liquid crystal composition 3 | Comparative liquid crystal composition 3 |
| Sealant | Sealant (1) | Sealant (2) | Sealant (3) | Sealant (4) | Sealant (5) |
| VHR | 98.0 | 97.3 | 97.7 | 97.5 | 97.1 |
| Uneven alignment | Bad | Poor | Poor | Poor | Poor |
| Screen burn-in | Bad | Poor | Poor | Poor | Poor |

Each of the liquid crystal display devices of Comparative Examples 6 to 15 had a lower VHR than the liquid crystal display device of the present invention. In the evaluation of uneven alignment, an unacceptable degree of uneven alignment was observed. Furthermore, in the evaluation of screen burn-in, an unacceptable degree of afterimages was observed.

Comparative Examples 16 to 25

Except that comparative liquid crystal compositions 4 and 5 shown below were used in place of the comparative liquid crystal composition 1, IPS liquid crystal display devices of Comparative Examples 16 to 25 were produced as in Comparative Example 1, and the VHRs thereof were measured. The liquid crystal display devices were subjected to the evaluations of uneven alignment and screen burn-in. Tables 30 and 31 show results of the measurement and evaluations.

TABLE 29

| Comparative liquid crystal composition 4 | | Comparative liquid crystal composition 5 | |
|---|---|---|---|
| Compound | Content (%) | Compound | Content (%) |
| 4-Cy-Cy-1d0 | 15 | 2-Cy-CY-1d0 | 32 |
| 0d1-Cy-Cy-Ph-1 | 4 | 0d1-Cy-Cy-Ph-1 | 4 |
| 0d3-Cy-Cy-Ph-1 | 14 | 2-Ph-Ph1-Ph-3 | 10 |
| 3-Cy-Ph-Ph-Cy-3 | 3 | 2-Ph-Ph1-Ph-5 | 11 |
| 3-Cy-Ph-Ph1-Cy-3 | 4 | 3-Ph-Ph1-Ph-5 | 7 |
| 1-Cy-Cy-Ph3-F | 9 | 2-Cy-Cy-Ph-F | 6 |
| 2-Cy-Cy-Ph3-F | 10 | 3-Cy-Cy-Ph-F | 21 |
| 3-Cy-Cy-Ph3-F | 10 | 5-Cy-Ph-Ph-F | 7 |
| 5-Cy-Cy-Ph3-F | 5 | 3-Cy-Ph-Ph3-F | 2 |
| 3-Cy-Ph1-Ph3-F | 8 | Tni/° C. | 77.2 |
| 5-Cy-Ph1-Ph3-F | 7 | $\Delta n$ | 0.135 |

TABLE 29-continued

| Comparative liquid crystal composition 4 | | Comparative liquid crystal composition 5 | |
|---|---|---|---|
| Compound | Content (%) | Compound | Content (%) |
| 3-Ph-Ph1-Ph3-F | 3 | $\Delta\epsilon$ | 4.5 |
| 3-Cy-Cy-Ph1-Ph3-F | 8 | $\gamma 1$/mPa·s | 57 |
| Tni/° C. | 101.0 | $\eta$/mPa·s | 10.5 |
| $\Delta n$ | 0.095 | | |
| $\Delta\epsilon$ | 8.2 | | |
| $\gamma 1$/mPa·s | 115 | | |
| $\eta$/mPa·s | 23.6 | | |

TABLE 30

|  | Comparative Example 16 | Comparative Example 17 | Comparative Example 18 | Comparative Example 19 | Comparative Example 20 |
|---|---|---|---|---|---|
| Liquid crystal composition | Comparative Liquid crystal composition 4 | Comparative Liquid crystal composition 4 | Comparative Liquid crystal composition 4 | Comparative Liquid crystal composition 4 | Comparative Liquid crystal composition 4 |
| Sealant | Sealant (1) | Sealant (2) | Sealant (3) | Sealant (4) | Sealant (5) |
| VHR | 97.8 | 97.2 | 97.6 | 97.5 | 97.0 |
| Uneven alignment | Bad | Poor | Poor | Poor | Poor |
| Screen burn-in | Bad | Poor | Bad | Poor | Poor |

TABLE 31

|  | Comparative Example 21 | Comparative Example 22 | Comparative Example 23 | Comparative Example 24 | Comparative Example 25 |
|---|---|---|---|---|---|
| Liquid crystal composition | Comparative Liquid crystal composition 5 | Comparative Liquid ctystal composition 5 | Comparative Liquid crystal composition 5 | Comparative Liquid crystal composition 5 | Comparative Liquid crystal composition 5 |
| Sealant | Sealant (1) | Sealant (2) | Sealant (3) | Sealant (4) | Sealant (5) |
| VHR | 98.0 | 97.6 | 97.8 | 97.7 | 97.2 |
| Uneven alignment | Bad | Poor | Bad | Poor | Poor |
| Screen burn-in | Bad | Poor | Poor | Poor | Poor |

Each of the liquid crystal display devices of Comparative Examples 16 to 25 had a lower VHR than the liquid crystal display device of the present invention. In the evaluation of uneven alignment, an unacceptable degree of uneven alignment was observed. Furthermore, in the evaluation of screen burn-in, an unacceptable degree of afterimages was observed.

Comparative Examples 26 to 40

Except that comparative liquid crystal compositions 6 to 8 were used in place of the comparative liquid crystal composition 1, IPS liquid crystal display devices of Comparative Examples 26 to 40 were produced as in Comparative Example 1, and the VHRs thereof were measured. The liquid crystal display devices were subjected to the evaluations of uneven alignment and screen burn-in. Tables 33 to 35 show results of the measurement and evaluations.

TABLE 32

| Comparative liquid crystal composition 6 | | Comparative liquid crystal composition 7 | |
|---|---|---|---|
| Compound | Content (%) | Compound | Content (%) |
| 4-Cy-Cy-1d0 | 18 | 4-Cy-Cy-1d0 | 18 |
| 3-Cy-Cy-4 | 15 | 3-Cy-Cy-4 | 15 |
| 0d1-Cy-Cy-Ph-1 | 8 | 0d1-Cy-Cy-Ph-1 | 8 |
| 2-Ph-Ph1-3 | 10 | 2-Ph-Ph1-3 | 10 |
| 2-Ph-Ph1-Ph-5 | 6 | 2-Ph-Ph1-Ph-5 | 6 |
| 3-Ph-Ph1-Ph-5 | 6 | 3-Ph-Ph1-Ph-5 | 5 |
| 2-Cy-Cy-Ph-F | 6 | 2-Cy-Cy-Ph-F | 6 |
| 3-Cy-Cy-Ph-F | 10 | 3-Cy-Cy-Ph-F | 5 |
| 5-Cy-Ph-Ph-F | 7 | 5-Cy-Ph-Ph-F | 7 |
| 3-Cy-Ph-Ph3-F | 14 | 3-Cy-Ph-Ph3-F | 15 |

TABLE 32-continued

| | | | |
|---|---|---|---|
| Tni/° C. | 73.5 | 3-Cy-Cy-Ph1-Ph3-F | 5 |
| Δn | 0.126 | Tni/° C. | 75.7 |
| Δε | 4.9 | Δn | 0.125 |
| γ1/mPa · s | 94 | Δε | 5.5 |
| η/mPa · s | 16.9 | γ1/mPa · s | 103 |
| | | η/mPa · s | 18.4 |

| Comparative liquid crystal composition 8 | |
|---|---|
| Compound | Content (%) |
| 4-Cy-Cy-1d0 | 17 |
| 3-Cy-Cy-4 | 15 |
| 0d3-Cy-Cy-Ph-1 | 8 |
| 3-Cy-Ph-Ph-2 | 10 |
| 2-Ph-Ph1-Ph-5 | 7 |
| 3-Ph-Ph1-Ph-5 | 7 |
| 2-Cy-Cy-Ph-F | 6 |
| 3-Cy-Cy-Ph-F | 5 |
| 5-Cy-Ph-Ph-F | 7 |
| 3-Cy-Ph-Ph3-F | 14 |
| 3-Cy-Cy-Ph1-Ph3-F | 4 |
| Tni/° C. | 85.3 |
| Δn | 0.128 |
| Δε | 4.8 |
| γ1/mPa · s | 107 |
| η/mPa · s | 19.0 |

TABLE 33

|  | Comparative Example 26 | Comparative Example 27 | Comparative Example 28 | Comparative Example 29 | Comparative Example 30 |
|---|---|---|---|---|---|
| Liquid crystal composition | Comparative Liquid crystal composition 6 | Comparative Liquid crystal composition 6 | Comparative Liquid crystal composition 6 | Comparative Liquid crystal composition 6 | Comparative Liquid crystal composition 6 |
| Sealant | Sealant (1) | Sealant (2) | Sealant (3) | Sealant (4) | Sealant (5) |
| VHR | 98.1 | 97.5 | 98.0 | 97.7 | 97.3 |
| Uneven alignment | Bad | Poor | Bad | Poor | Poor |
| Screen burn-in | Bad | Poor | Bad | Bad | Poor |

TABLE 34

|  | Comparative Example 31 | Comparative Example 32 | Comparative Example 33 | Comparative Example 34 | Comparative Example 35 |
|---|---|---|---|---|---|
| Liquid crystal composition | Comparative Liquid crystal composition 7 | Comparative Liquid crystal composition 7 | Comparative Liquid crystal composition 7 | Comparative Liquid crystal composition 7 | Comparative Liquid crystal composition 7 |
| Sealant | Sealant (1) | Sealant (2) | Sealant (3) | Sealant (4) | Sealant (5) |
| VHR | 97.8 | 97.4 | 97.7 | 97.6 | 97.1 |
| Uneven alignment | Bad | Poor | Poor | Poor | Poor |
| Screen burn-in | Bad | Poor | Poor | Poor | Poor |

TABLE 35

|  | Comparative Example 36 | Comparative Example 37 | Comparative Example 38 | Comparative Example 39 | Comparative Example 40 |
|---|---|---|---|---|---|
| Liquid crystal composition | Comparative Liquid crystal composition 8 | Comparative Liquid crystal composition 8 | Comparative Liquid crystal composition 8 | Comparative Liquid crystal composition 8 | Comparative Liquid crystal composition 8 |
| Sealant | Sealant (1) | Sealant (2) | Sealant (3) | Sealant (4) | Sealant (5) |
| VHR | 98.3 | 97.6 | 98.0 | 97.9 | 97.4 |
| Uneven alignment | Bad | Poor | Bad | Bad | Poor |
| Screen burn-in | Bad | Poor | Bad | Poor | Poor |

Each of the liquid crystal display devices of Comparative Examples 26 to 40 had a lower VHR than the liquid crystal display device of the present invention. In the evaluation of uneven alignment, an unacceptable degree of uneven alignment was observed. Furthermore, in the evaluation of screen burn-in, an unacceptable degree of afterimages was observed.

Comparative Examples 41 to 55

Except that comparative liquid crystal compositions 9 to 11 were used in place of the comparative liquid crystal composition 1, IPS liquid crystal display devices of Comparative Examples 41 to 55 were produced as in Comparative Example 1, and the VHRs thereof were measured. The liquid crystal display devices were subjected to the evaluations of uneven alignment and screen burn-in. Tables 37 to 39 show results of the measurement and evaluations.

TABLE 36

| Comparative liquid crystal composition 9 | | Comparative liquid crystal composition 10 | |
|---|---|---|---|
| Compound | Content (%) | Compound | Content (%) |
| 2-Cy-Cy-Ph3-F | 10 | 2-Cy-Cy-Ph3-F | 10 |
| 0d1-Cy-Cy-Ph1-F | 8 | 0d1-Cy-Cy-Ph1-F | 8 |

TABLE 36-continued

| Comparative liquid crystal composition 9 | | Comparative liquid crystal composition 10 | |
|---|---|---|---|
| 2-Ph-Ph3-Ph3-F | 10 | 2-Ph-Ph3-Ph3-F | 10 |
| 3-Cy-Cy-Ph3-F | 10 | 3-Cy-Cy-Ph3-F | 10 |
| 3-Cy-Cy-Ph1-Ph3-F | 8 | 3-Cy-Cy-Ph1-Ph3-F | 8 |
| 1-Cy-Cy-Ph3-F | 9 | 1-Cy-Cy-Ph3-F | 9 |
| 5-Cy-Cy-Ph3-F | 5 | 5-Cy-Cy-Ph3-F | 5 |
| 0d3-Ph-T-Ph-3d0 | 15 | 0d3-Ph-T-Ph-3d0 | 10 |
| 3-Cy-Ph-T-Ph-2 | 14 | 3-Cy-Ph3-T-Ph9-1 | 4 |
| 0d3-Ph-N-Ph-3d0 | 4 | 4-Ph-T-Ph-O2 | 4 |
| 3-Ph-VO-Cy-VO-Ph-3 | 4 | 3-Cy-Ph-T-Ph-2 | 7 |
| 3-Cy-Cy-VO-Ph-Cy-3 | 3 | 5-Cy-VO-Ph-1 | 5 |
| Tni/° C. | 101.6 | 3-Ph-VO-Cy-VO-Ph-3 | 7 |
| Δn | 0.151 | 3-Cy-Cy-VO-Ph-Cy-3 | 3 |
| Δε | 9.2 | Tni/° C. | 96.4 |
| γ1/mPa · s | 140 | Δn | 0.135 |
| η/mPa · s | 20.7 | Δε | 8.8 |
|  |  | γ1/mPa · s | 135 |
|  |  | η/mPa · s | 22.7 |

| Comparative liquid crystal composition 11 | |
|---|---|
| Compound | Content (%) |
| 2-Cy-Cy-Ph3-F | 10 |
| 0d1-Cy-Cy-Ph1-F | 8 |
| 3-Cy-Cy-Ph3-F | 10 |
| 2-Ph-Ph3-Ph3-F | 6 |
| 3-Cy-Cy-Ph1-Ph3-F | 8 |

TABLE 36-continued

| Comparative liquid crystal composition 9 | | Comparative liquid crystal composition 10 |
| --- | --- | --- |
| | 5-Cy-Cy-Ph3-F | 5 |
| | 0d3-Ph-T-Ph-3d0 | 10 |
| | 3-Cy-Ph3-T-Ph9-1 | 4 |
| | 3-Cy-Cy-Ph3-F | 4 |
| | 4-Ph-T-Ph-O2 | 4 |
| | 5-Cy-Cy-Ph3-F | 9 |
| | 5-Cy-VO-Ph-1 | 5 |
| | 0d3-Ph-N-Ph-3d0 | 7 |
| | 3-Ph-VO-Cy-VO-Ph-3 | 7 |
| | 3-Cy-Cy-VO-Ph-Cy-3 | 3 |
| | Tni/° C. | 99.1 |
| | Δn | 0.135 |
| | Δε | 7.6 |
| | γ1/mPa · s | 130 |
| | η/mPa · s | 24.3 |

TABLE 37

| | Comparative Example 41 | Comparative Example 42 | Comparative Example 43 | Comparative Example 44 | Comparative Example 45 |
| --- | --- | --- | --- | --- | --- |
| Liquid crystal composition | Comparative Liquid crystal composition 9 | Comparative Liquid crystal composition 9 | Comparative Liquid crystal composition 9 | Comparative Liquid crystal composition 9 | Comparative Liquid crystal composition 9 |
| Sealant | Sealant (1) | Sealant (2) | Sealant (3) | Sealant (4) | Sealant (5) |
| VHR | 97.8 | 97.3 | 97.7 | 97.5 | 97.0 |
| Uneven alignment | Poor | Poor | Bad | Poor | Poor |
| Screen burn-in | Bad | Poor | Poor | Poor | Poor |

TABLE 38

| | Comparative Example 46 | Comparative Example 47 | Comparative Example 48 | Comparative Example 49 | Comparative Example 50 |
| --- | --- | --- | --- | --- | --- |
| Liquid crystal composition | Comparative Liquid crystal composition 10 | Comparative Liquid crystal composition 10 | Comparative Liquid crystal composition 10 | Comparative Liquid crystal composition 10 | Comparative Liquid crystal composition 10 |
| Sealant | Sealant (1) | Sealant (2) | Sealant (3) | Sealant (4) | Sealant (5) |
| VHR | 97.9 | 97.5 | 97.9 | 97.7 | 97.2 |
| Uneven alignment | Bad | Poor | Poor | Poor | Poor |
| Screen burn-in | Bad | Poor | Bad | Poor | Poor |

TABLE 39

| | Comparative Example 51 | Comparative Example 52 | Comparative Example 53 | Comparative Example 54 | Comparative Example 55 |
| --- | --- | --- | --- | --- | --- |
| Liquid crystal composition | Comparative Liquid crystal composition 11 | Comparative Liquid crystal composition 11 | Comparative Liquid crystal composition 11 | Comparative Liquid crystal composition 11 | Comparative Liquid crystal composition 11 |
| Sealant | Sealant (1) | Sealant (2) | Sealant (3) | Sealant (4) | Sealant (5) |
| VHR | 98.0 | 97.3 | 97.8 | 97.5 | 97.1 |
| Uneven alignment | Bad | Poor | Poor | Poor | Poor |
| Screen burn-in | Bad | Poor | Bad | Poor | Poor |

Each of the liquid crystal display devices of Comparative Examples 41 to 55 had a lower VHR than the liquid crystal display device of the present invention. In the evaluation of uneven alignment, an unacceptable degree of uneven alignment was observed. Furthermore, in the evaluation of screen burn-in, an unacceptable degree of afterimages was observed.

Comparative Examples 56 to 71

Except that the sealants used in Examples 5, 13, 17, 25, 37, 45, 61, and 65 were changed to comparative sealants (C1) and (C2), liquid crystal display devices of Comparative Examples 56 to 71 were similarly produced, and the % VHRs thereof were measured. The liquid crystal display devices were subjected to the evaluations of uneven alignment and screen burn-in. Tables 40 to 43 show results of the measurement and evaluations.

TABLE 40

| | Comparative Example 56 | Comparative Example 57 | Comparative Example 58 | Comparative Example 59 |
| --- | --- | --- | --- | --- |
| Liquid crystal composition | Liquid crystal composition 2 | Liquid crystal composition 4 | Liquid crystal composition 5 | Liquid crystal composition 7 |
| Sealant | Comparative sealant (C1) | Comparative sealant (C1) | Comparative sealant (C1) | Comparative sealant (C1) |
| VHR | 98.0 | 98.0 | 97.5 | 97.6 |

TABLE 40-continued

| | Comparative Example 56 | Comparative Example 57 | Comparative Example 58 | Comparative Example 59 |
|---|---|---|---|---|
| Uneven alignment | Poor | Poor | Poor | Poor |
| Screen burn-in | Poor | Poor | Poor | Poor |

TABLE 41

| | Comparative Example 60 | Comparative Example 61 | Comparative Example 62 | Comparative Example 63 |
|---|---|---|---|---|
| Liquid crystal composition | Liquid crystal composition 10 | Liquid crystal composition 12 | Liquid crystal composition 16 | Liquid crystal composition 17 |
| Sealant | Comparative sealant (C1) | Comparative sealant (C1) | Comparative sealant (C1) | Comparative sealant (C1) |
| VHR | 97.8 | 97.7 | 97.6 | 97.3 |
| Uneven alignment | Poor | Poor | Poor | Poor |
| Screen burn-in | Bad | Poor | Poor | Poor |

TABLE 42

| | Comparative Example 64 | Comparative Example 65 | Comparative Example 66 | Comparative Example 67 |
|---|---|---|---|---|
| Liquid crystal composition | Liquid crystal composition 2 | Liquid crystal composition 4 | Liquid crystal composition 5 | Liquid crystal composition 7 |
| Sealant | Comparative sealant (C2) | Comparative sealant (C2) | Comparative sealant (C2) | Comparative sealant (C2) |
| VHR | 97.7 | 97.7 | 97.3 | 97.5 |
| Uneven alignment | Poor | Poor | Poor | Poor |
| Screen burn-in | Poor | Poor | Poor | Poor |

TABLE 43

| | Comparative Example 68 | Comparative Example 69 | Comparative Example 70 | Comparative Example 71 |
|---|---|---|---|---|
| Liquid crystal composition | Liquid crystal composition 10 | Liquid crystal composition 12 | Liquid crystal composition 16 | Liquid crystal composition 17 |
| Sealant | Comparative sealant (C2) | Comparative sealant (C2) | Comparative sealant (C2) | Comparative sealant (C2) |
| VHR | 97.6 | 97.5 | 97.4 | 97.1 |
| Uneven alignment | Poor | Poor | Poor | Poor |
| Screen burn-in | Poor | Poor | Poor | Poor |

Each of the liquid crystal display devices of Comparative Examples 56 to 71 had a lower VHR than the liquid crystal display device of the present invention. In the evaluation of uneven alignment, an unacceptable degree of uneven alignment was observed. Furthermore, in the evaluation of screen burn-in, an unacceptable degree of afterimages was observed.

The invention claimed is:

1. A liquid crystal display device comprising a first substrate, a second substrate, a liquid crystal layer containing a liquid crystal composition and disposed between the first and second substrates, and a cured product of a curable resin composition which is cured by being exposed to an energy ray or heat, the first and second substrates being attached to each other by the cured product, wherein the liquid crystal composition contains at least one compound represented by General Formula (I)

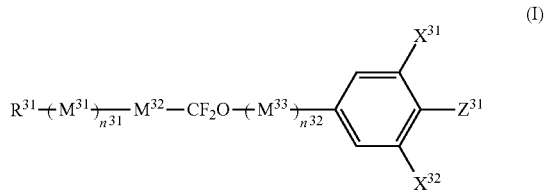

(where $R^{31}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $M^{31}$ to $M^{33}$ each independently represent a trans-1,4-cyclohexylene group or a 1,4-phenylene group, one or two —$CH_2$— moieties of the trans-1,4-cyclohexylene group are optionally substituted with —O— such that oxygen atoms do not directly adjoin each other, and one or two hydrogen atoms of the phenylene group are optionally substituted with fluorine atoms; $X^{31}$ and $X^{32}$ each independently represent a hydrogen atom or a fluorine atom; $Z^{31}$ represents a fluorine atom, a trifluoromethoxy group, or a trifluoromethyl group; $n^{31}$ and $n^{32}$ each independently represent 0, 1, or 2, and $n^{31}+n^{32}$ is equal to 0, 1, or 2; in the case where $M^{31}$ is multiple, the multiple $M^{31}$'s are the same as or different from each other; and in the case where $M^{33}$ is multiple, the multiple $M^{33}$'s are the same as or different from each other) and at least one compound selected from the group consisting of compounds represented by General Formulae (II-b) to (II-f)

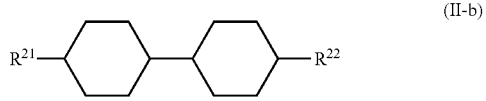

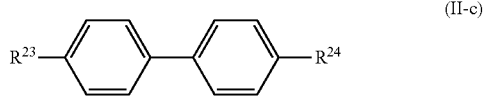

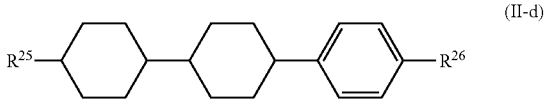

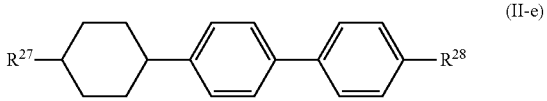

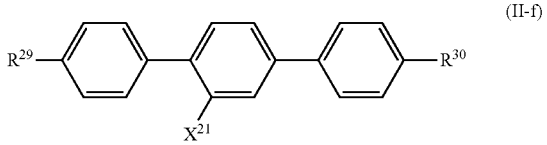

(where $R^{21}$ to $R^{30}$ each independently represent an alkyl group having 1 to 10 carbon atoms, an alkoxy group having 1 to 10 carbon atoms, or an alkenyl group having 2 to 10 carbon atoms; and $X^{21}$ represents a hydrogen atom or a fluorine atom), and the curable resin composition contains a compound having at least one (meth)acrylic group and at least one epoxy group per molecule and has a hydrogen-bonding functional group value from $3 \times 10^{-3}$ to $5 \times 10^{-3}$ mol/g.

2. The liquid crystal display device according to claim 1, wherein the curable resin composition contains a polymerization initiator.

3. The liquid crystal display device according to claim 2, wherein the polymerization initiator is a photopolymerization initiator and/or a thermal polymerization initiator.

4. The liquid crystal display device according to claim 1, wherein the curable resin composition contains a silane coupling agent.

5. The liquid crystal display device according to claim 1, wherein the curable resin composition contains a filler.

6. The liquid crystal display device according to claim 1, wherein the compound having at least one (meth)acrylic group and at least one epoxy group per molecule is a (meth)acrylic acid-modified epoxy resin and/or a urethane-modified (meth)acrylic epoxy resin.

7. The liquid crystal display device according to claim 1, wherein the curable resin composition contains a resin having a (meth)acryloyloxy group and/or a resin having an epoxy group.

8. The liquid crystal display device according to claim 1, wherein the equivalent ratio of the (meth)acrylic group to the epoxy group in the curable resin composition is in the range of 40:60 to 95:5.

9. The liquid crystal display device according to claim 1, wherein the curable resin composition contains fine resin particles.

10. The liquid crystal display device according to claim 1, wherein the compound represented by General Formula (I) is any of compounds represented by General Formulae (I-a) to (I-f)

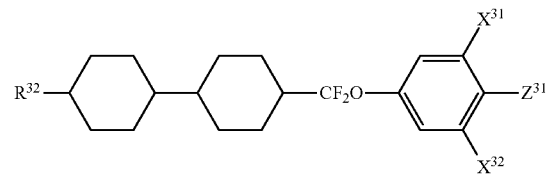
(I-a)

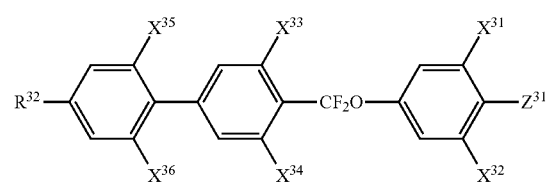
(I-b)

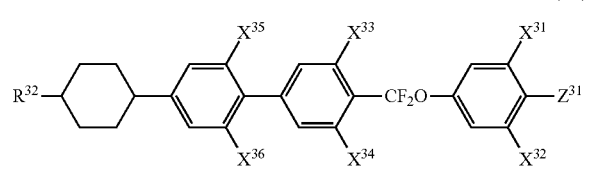
(I-c)

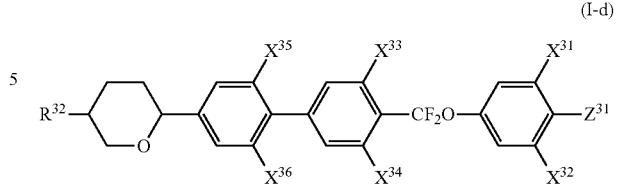
(I-d)

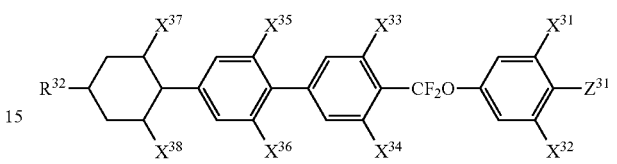
(I-e)

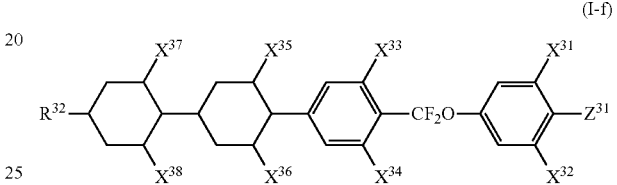
(I-f)

(where $R^{32}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{31}$ to $X^{38}$ each independently represent a hydrogen atom or a fluorine atom; and $Z^{31}$ represents a fluorine atom, a trifluoromethoxy group, or a trifluoromethyl group).

11. The liquid crystal display device according to claim 1, wherein the liquid crystal composition layer further contains at least one compound selected from the group consisting of compounds represented by General Formulae (III-a) to (III-f)

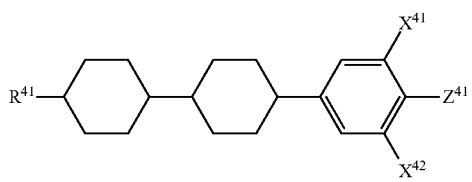
(III-a)

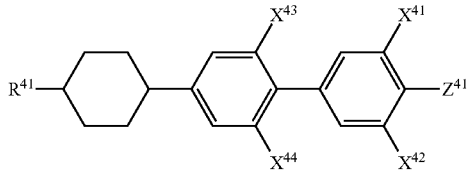
(III-b)

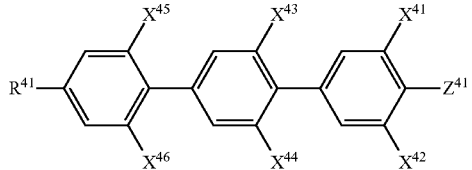
(III-c)

-continued

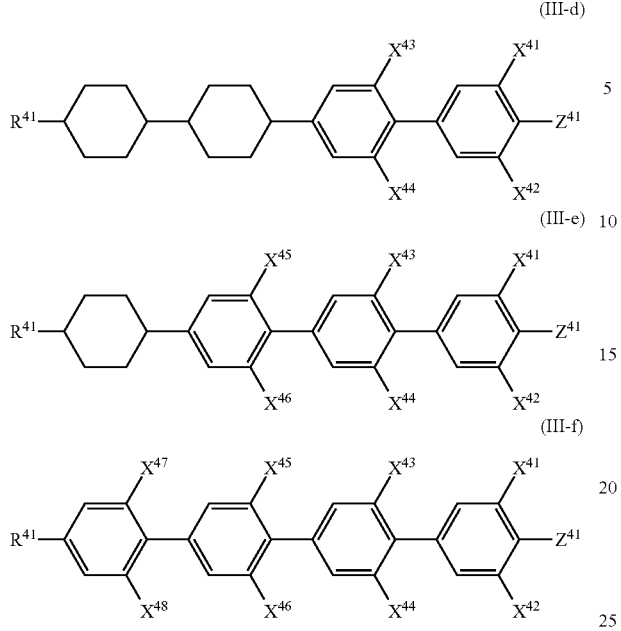

(III-d)

(III-e)

(III-f)

(where $R^{41}$ represents an alkyl group having 1 to 10 carbon atoms, an alkoxy group having 1 to 10 carbon atoms, an alkenyl group having 2 to 10 carbon atoms, or an alkenyloxy group having 2 to 10 carbon atoms; $X^{41}$ to $X^{48}$ each independently represent a hydrogen atom or a fluorine atom; and $Z^{41}$ represents a fluorine atom, a trifluoromethoxy group, or a trifluoromethyl group).

12. The liquid crystal display device according to claim 1, wherein the liquid crystal composition layer is a polymer formed through polymerization of the liquid crystal composition further containing at least one polymerizable compound.

13. The liquid crystal display device according to claim 1, wherein the liquid crystal composition layer contains a difunctional monomer represented by General Formula (V)

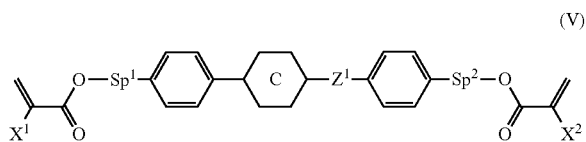

(V)

(where $X^1$ and $X^2$ each independently represent a hydrogen atom or a methyl group; $Sp^1$ and $Sp^2$ each independently represent a single bond, an alkylene group having 1 to 8 carbon atoms, or —O—$(CH_2)_s$— (where s represents an integer from 2 to 7, and the oxygen atom is bonded to an aromatic ring); $Z^1$ represents —$OCH_2$—, —$CH_2O$—, —COO—, —OCO—, —$CF_2O$—, —$OCF_2$—, —$CH_2CH_2$—, —$CF_2CF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —$CY^1$=$CY^2$— (where $Y^1$ and $Y^2$ each independently represent a fluorine atom or a hydrogen atom), —C≡C—, or a single bond; and C represents a 1,4-phenylene group, a trans-1,4-cyclohexylene group, or a single bond, and in each 1,4-phenylene group in the formula, any hydrogen atom is optionally substituted with a fluorine atom).

* * * * *